(12) United States Patent
Nozawa et al.

(10) Patent No.: US 12,344,491 B2
(45) Date of Patent: Jul. 1, 2025

(54) WORK ASSISTING APPARATUS

(71) Applicant: YUTAKA GIKEN CO., LTD., Hamamatsu (JP)

(72) Inventors: Yoichi Nozawa, Hamamatsu (JP); Hiroharu Nakahara, Hamamatsu (JP); Kentaro Watanabe, Hamamatsu (JP); Koki Hirakawa, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 224 days.

(21) Appl. No.: 18/210,738

(22) Filed: Jun. 16, 2023

(65) Prior Publication Data

US 2023/0416000 A1 Dec. 28, 2023

(30) Foreign Application Priority Data

Jun. 23, 2022 (JP) ................. 2022-101417

(51) Int. Cl.
*B65G 7/12* (2006.01)
(52) U.S. Cl.
CPC ........ *B65G 7/12* (2013.01); *B65G 2203/0266* (2013.01)
(58) Field of Classification Search
CPC ............ B65G 7/12; B65G 2203/0266
USPC ................................. 224/157, 162
See application file for complete search history.

(56) References Cited

U.S. PATENT DOCUMENTS

| 3,862,726 A | * | 1/1975 | Ulrich | B60R 22/41 |
| | | | | 242/383.1 |
| 4,036,322 A | * | 7/1977 | Takada | B60R 22/38 |
| | | | | 242/383.1 |
| 4,165,844 A | * | 8/1979 | Tanaka | B60R 22/44 |
| | | | | 242/372 |

(Continued)

FOREIGN PATENT DOCUMENTS

| JP | 2012-213543 A | 11/2012 |
| JP | 2015-524752 A | 8/2015 |

(Continued)

OTHER PUBLICATIONS

JP-2012213543-A; "Back Strength Assist Device"; Yamana, Takahiro; Japan; (Year: 2012).*

(Continued)

*Primary Examiner* — Nathan J Newhouse
*Assistant Examiner* — Lester L Vanterpool
(74) *Attorney, Agent, or Firm* — Carrier, Shende & Associates P.C.; Joseph P. Carrier; Fulchand P. Shende

(57) ABSTRACT

In a work assisting apparatus helping workers to lift heavy objects with hands, their work is assisted with a light-weight and simply configured winding device, contributing to cost and load reduction while refraining a belt as a support wire rope from hindering their normal working behavior, or another objects from being caught in or wound around the belt, the work assisting apparatus including: a fitting portion fitted on a torso, a wearing portion worn on an arm or a hand of a worker, a belt with one end portion combined to the wearing portion, and a winding device coupled to the fitting (Continued)

portion and winding another end side of the belt. The winding device includes a lock mechanism locking a draw-out position of the belt so as to restrict further drawing out when drawing the one end portion.

9 Claims, 18 Drawing Sheets

(56) References Cited

U.S. PATENT DOCUMENTS

| | | | | | |
|---|---|---|---|---|---|
| 4,346,858 | A | * | 8/1982 | Hollowell | B60R 22/44 242/372 |
| 4,485,986 | A | * | 12/1984 | Sugimoto | B60R 22/405 242/383.1 |
| 8,579,223 | B2 | * | 11/2013 | Aranda | B60R 22/41 242/383.1 |
| 8,740,126 | B2 | * | 6/2014 | Tatsuma | B60R 22/405 242/383.1 |
| 8,925,850 | B2 | * | 1/2015 | Tatsuma | B60R 22/38 242/383.1 |
| 11,045,342 | B2 | | 6/2021 | Doyle | |

FOREIGN PATENT DOCUMENTS

| | | |
|---|---|---|
| JP | 2016-129916 A | 7/2016 |
| JP | 2018-149624 A | 9/2018 |
| JP | 2020-189377 A | 11/2020 |
| JP | 2021-011006 A | 2/2021 |
| JP | 2021-049601 A | 4/2021 |
| JP | 2021-094650 A | 6/2021 |
| WO | 2017/213235 A1 | 12/2017 |

OTHER PUBLICATIONS

JP-2020189377-A; "Assist Apparatus"; Hamanishi, Mari: Japan; (Year: 2020).*
JP-2021011006-A; "Assist Device"; Arai, Tomoki; Japan; (Year: 2021).*
JP-2021049601-A; "Assist Device"; Arai, Tomoki; Japan; (Year: 2021).*
JP-2021094650-A; "Movement Support Device"; Habasaki, Shohei; Japan; (Year: 2021).*
The English machine translation of Office Action issued on Aug. 7, 2024 in the corresponding Japanese Patent Application No. 2022-101417.

* cited by examiner

WORK ASSISTING APPARATUS

BACKGROUND

1. Technical Field

The present invention relates to a work assisting apparatus, and especially a work assisting apparatus that assists work in which a worker lifts a heavy object with hands.

2. Related Art

The work assisting apparatus is conventionally known as disclosed in, for example, JP-T-2015-524752, JP-A-2018-149624, and JP-A-2016-129916 shown below. In these patent literatures, one end portion of a support wire rope (for example, a harness, a string-like member, or a wire) is attached to an arm or a hand of a worker, and a support force for assisting work can be provided to the arm or the hand of the worker from the support wire rope.

PRIOR ART DOCUMENTS

Patent Documents

Patent Document 1: JP-T-2015-524752
Patent Document 2: JP-A-2018-149624
Patent Document 3: JP-A-2016-129916

SUMMARY

In the work assisting apparatus of JP-T-2015-524752, a base portion of a harness as a support wire rope is supported by a sturdy metal frame fixed to the back. The harness does not have a structure in which the harness is wound up and housed, and the entire harness is always exposed even while not working. Therefore, a normal behavior while not working is possibly inhibited by the harness, and the use of the sturdy metal frame increases the weight of the device, thus causing a problem of increasing a load on the worker and the like.

In the work assisting apparatus of JP-A-2018-149624, base portions of string-like members 161, 162 as the support wire ropes are supported by sturdy metal frames (that is, a back member 110 and a support member 140) attached to the back, and a move of raising the upper body is assisted by turning the metal frame by an actuator 151. Consequently, pulling up the hands of the worker via the string-like members assists lifting a heavy object. In this case, the string-like member does not have a structure in which the string-like member is wound up and housed, and the string-like member and the metal frame extending above the shoulder are always exposed even while not working. Therefore, a normal behavior while not working is possibly inhibited by the string-like member and the rigid frame, and turning the sturdy rigid frames by the luggage lifting actuator increases the weight of the device, thus causing a problem of increasing a load on the worker.

The work assisting apparatus of JP-A-2016-129916 has a structure in which a base portion of a wire 31 as a support wire rope is wound up by a reel motor 13 fixed to the back via an upper end portion of a sturdy rigid arm portion 11 that is fixed to the back and extends high above the head. Lifting a heavy object is assisted by attaching one end portion of the wire 31 drooping from the upper end portion of the rigid arm portion 11 to the hand of the worker. Therefore, a normal behavior while not working is inhibited by the wire 31 drooping long from the upper end portion of the rigid arm portion 11, and for example, a worker needs to work carefully so as not to get a surrounding object caught in the wire. Additionally, the worker needs to work while supporting heavy objects such as the large-sized rigid arm portion 11, the luggage lifting motor 13, and a battery 40, thus causing a problem of increasing a load on the worker.

The present invention has been made in consideration of the circumstance, and its object is to provide a work assisting apparatus capable of solving the problems of the conventional devices with a simple structure.

To achieve the above-described object, the first aspect of the present invention is a work assisting apparatus for assisting work in which a worker lifts a heavy object with a hand. The work assisting apparatus includes a fitting portion, a wearing portion, a belt, and a winding device. The fitting portion is configured to be fitted on a torso of the worker. The wearing portion is configured to be worn on an arm or the hand of the worker. The belt has one end portion combined to the wearing portion. The winding device is coupled to the fitting portion and configured to wind another end side of the belt. The winding device includes a biasing mechanism and a lock mechanism. The biasing mechanism provides a biasing force in a winding direction to the belt. The lock mechanism is configured to lock a draw-out position of the belt so as to restrict further drawing out when the one end portion of the belt is drawn out by any draw-out length.

In the second aspect of the present invention, in addition to the first aspect, the winding device is fitted to a waist part of the worker via the fitting portion such that an intermediate portion of the belt drawn out from the winding device is slidably put on a shoulder of the worker.

In the third aspect of the present invention, in addition to the first or the second aspect, the lock mechanism is connected to an unlocking instruction device for releasing the lock of the lock mechanism before a start and after an end of the work.

In the fourth aspect of the present invention, in addition to the third aspect, the unlocking instruction device includes at least one of an automatic unlocking instruction device or a manual unlocking instruction device. The automatic unlocking instruction device is configured to automatically release the lock of the lock mechanism before the start and after the end of the work based on a detection result by a detector configured to detect a change of a contact surface pressure or a relative distance between the wearing portion and the heavy object before and after the start and before and after the end of the work. The manual unlocking instruction device is configured to release the lock of the lock mechanism as needed based on an operation input to an unlock operation device configured to be manually operated as necessary.

In the fifth aspect of the present invention, in addition to the first or the second aspect, the wearing portion has a shape in which the wearing portion is wearable by inserting the hand through the wearing portion in a state where the wearing portion is caught on at least one finger of the worker.

In the sixth aspect of the present invention, in addition to the first or the second aspect, the fitting portion includes a waist belt wound around the waist part of the worker and held on the waist part, and the winding device is coupled to the waist belt.

In the seventh aspect of the present invention, in addition to the sixth aspect, the waist belt is connected to a leg belt configured to be worn on a thigh by inserting at least one of the thighs of the worker through the leg belt.

In the eighth aspect of the present invention, in addition to the first or the second aspect, the belt includes a branching portion at which the belt is branched into two on a way from the other end side toward the one end portion of the belt.

In the ninth aspect of the present invention, in addition to the first or the second aspect, the work assisting apparatus further includes a work jacket wearable by the worker such that the work jacket covers at least upper portions of the shoulders of the worker. The work jacket includes a belt guide through which the belt slidably passes so as to keep the state where the intermediate portion of the belt is put on the shoulder of the worker.

Advantageous Effects of Invention

According to the first aspect of the present invention, the work assisting apparatus includes a fitting portion, a wearing portion, a belt, and a winding device. The fitting portion is configured to be fitted on a torso of the worker. The wearing portion is configured to be worn on an arm or the hand of the worker. The belt has one end portion combined to the wearing portion. The winding device is coupled to the fitting portion and configured to wind another end side of the belt. The winding device includes a biasing mechanism and a lock mechanism. The biasing mechanism provides a biasing force in a winding direction to the belt. The lock mechanism is configured to lock a draw-out position of the belt so as to restrict further drawing out when the one end portion of the belt is drawn out by any draw-out length. Accordingly, the wearing portion of the one end portion of the belt drawn out from the winding device fitted on the torso of the worker is worn on the arm or the hand of the worker, and in this state, when the lock of the lock mechanism is activated to restrict the further drawing out of the belt before the worker appropriately draws out the belt to grasp the heavy object with the hand, the worker can transfer at least a part of the load applied to the arm or the hand to the torso via the belt and the winding device in the work of lifting or holding the heavy object with the hand. Therefore, the load on the worker is reduced by its amount, and the work can be assisted. Since the winding device can provide the above-described effect of work assist with the light and simple configuration that simply restricts the draw-out length of the belt by the lock mechanism, the need for the large-sized rigid frame or the luggage lifting actuator linked to the winding device is eliminated, thus allowing the contribution to the cost reduction and the reduction of the load on the worker. Moreover, the winding device is exclusively used for restricting the drawing out of the belt during the work, and the belt can be wound up as needed not only during the work but also before the work start and after the work end. Therefore, a concern that the belt hinders the normal behavior while not working, or a concern that another object is improperly caught in or wound around the belt is eliminated, and the belt length before the work start or during the work can be adjusted without obstruction. Further, since the wearing portion is combined to the one end portion of the belt, the maintenance is easy, and there is less possibility for losing the belt.

According to the second aspect, the winding device is fitted to a waist part of the worker via the fitting portion such that an intermediate portion of the belt drawn out from the winding device is slidably put on a shoulder of the worker. This provides a support configuration in which in the work assist, while the winding device is supported by the waist part of the worker, the intermediate portion of the belt drawn out from the winding device passes through the shoulder of the worker, and the arm or the hand of the worker is hanged via the one end portion side of the belt. Accordingly, not only the winding device fitted near the waist part can reduce the possibility of hindering the work, but also the gravitational force acting on the belt during the work assist is appropriately distributed to not only the arm but also the waist part, the shoulder, and their peripheries of the worker in a balanced manner, thus allowing the contribution to the further reduction of the load on the worker.

According to the third aspect, the lock mechanism is connected to an unlocking instruction device for releasing the lock of the lock mechanism before a start and after an end of the work. Therefore, before the start and after the end of the work, by releasing the lock of the lock mechanism by the unlocking instruction device, the draw-out length of the belt from the winding device can be easily adjusted to any length. Accordingly, before the start and after the end of the work, the wearing portion of the one end portion of the belt can be smoothly worn on or removed from the arm or the hand of the worker, and the heavy object can be smoothly grasped with the hand in the state where the wearing portion is worn on the arm or the hand without hindrance by the winding device.

According to the fourth aspect, when the unlocking instruction device includes an automatic unlocking instruction device, the automatic unlocking instruction device can automatically release the lock of the lock mechanism before the start and after the end of the work, and activates the lock of the lock mechanism after the start to the end of the work based on the detection result by the detector configured to detect the change of the contact surface pressure or the relative distance between the wearing portion and the heavy object before and after the start and before and after the end of the work. When the unlocking instruction device includes a manual unlocking instruction device, the manual unlocking instruction device can release the lock of the lock mechanism as needed based on an operation input to an unlock operation device configured to be manually operated as necessary. Accordingly, the lock of the lock mechanism can be released before the start and after the end of the work, and the lock of the lock mechanism can be activated after the start to the end of the work corresponding to whether the operation has been input to the unlock operation device or not.

According to the fifth aspect, the wearing portion has a shape in which the wearing portion is wearable by inserting the hand through the wearing portion in a state where the wearing portion is caught on at least one finger of the worker. Therefore, by inserting the hand through the wearing portion in the state where the finger is caught on the wearing portion in getting ready for the work, the belt can be easily and appropriately drawn out using the hand, thereby enhancing the work efficiency.

According to the sixth aspect, the fitting portion includes a waist belt wound around the waist part of the worker and held on the waist part, and the winding device is coupled to the waist belt. Accordingly, since the reactive force acting on the winding device in assisting the work of lifting or holding the heavy object can be widely dispersed from the waist belt to the waist part and its periphery, the load on the waist part is reduced. Moreover, since an appropriate pressure is applied to the abdomen by the waist belt, an abdominal pressure is increased, thus allowing the contribution to the reduction of the load on the lumbar spine.

According to the seventh aspect, the waist belt is connected to a leg belt configured to be worn on a thigh by inserting at least one of the thighs of the worker through the leg belt. Accordingly, moving upward of the winding device itself in lifting the heavy object can be suppressed. Therefore, the winding device can be effectively used at the appropriate position.

According to the eighth aspect, the belt includes a branching portion at which the belt is branched into two on a way from the other end side toward the one end portion of the belt. Accordingly, the number of the belts to be used in the other end side of the belt can be reduced, and eventually, the number of the winding devices to be installed can be reduced, thus allowing the contribution to the cost reduction.

According to the ninth aspect, the work assisting apparatus further includes a work jacket wearable by the worker such that the work jacket covers at least upper portions of the shoulders of the worker. The work jacket includes a belt guide through which the belt slidably passes so as to keep the state where the intermediate portion of the belt is put on the shoulder of the worker. Accordingly, while the belt can be smoothly drawn out by the belt guides, the state where the intermediate portion of the belt is put on the shoulder of the worker can be appropriately kept, thus enhancing the work efficiency.

BRIEF DESCRIPTION OF DRAWINGS

FIG. 7A illustrates a state before wearing the wearing portion on the hand, and FIG. 7B illustrates a state after wearing the wearing portion on the hand;

FIG. 13A illustrates the second embodiment, and FIG. 13B illustrates a first modification of a manual unlocking instruction device;

FIG. 16A illustrates a leg belt (first and second embodiments) obliquely wound around a thigh, and FIG. 16B illustrates a leg belt approximately horizontally wound around the thigh;

DETAILED DESCRIPTION

The following describes embodiments of the present invention based on the attached drawings.

First, with reference to FIG. 1 to FIG. 12, a first embodiment of a work assisting apparatus according to the present invention will be described.

A work assisting apparatus A is a device for supporting and assisting work in which a worker P lifts and holds a heavy object W with a hand Ph, and includes a fitting portion 10, a wearing portion 20, a belt 40, and a winding device R. The fitting portion 10 is configured to be fitted on a torso Pm (waist part Pw in the embodiment) of the worker P. The wearing portion 20 is configured to be worn on the hand Ph of the worker P. The belt 40 has one end portion 40a combined to the wearing portion 20. The winding device R is coupled to the fitting portion 10, and configured to wind the other end side of the belt 40.

Figures 7A, 7B:
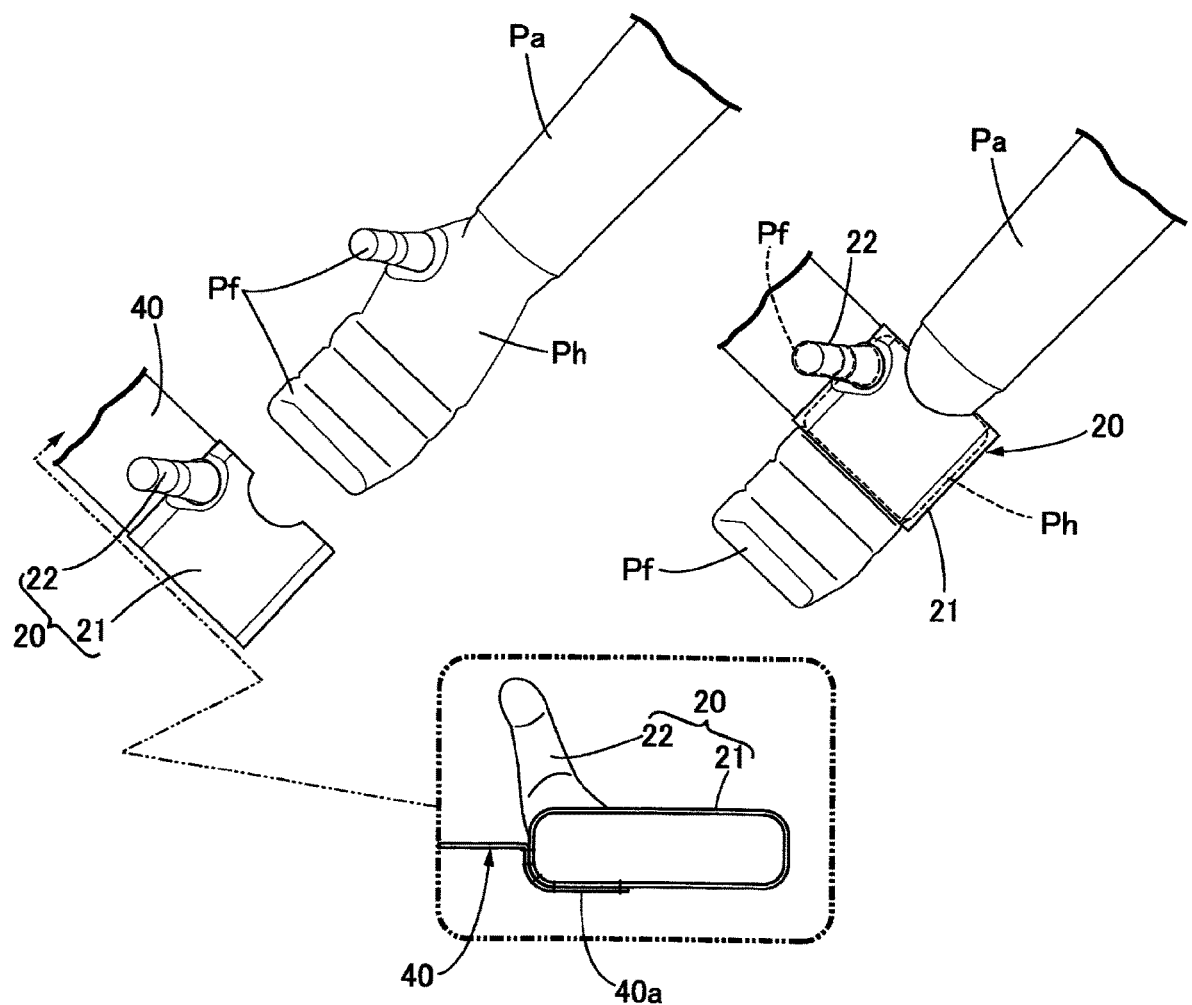
FIGS. 7A and 7B illustrate a relation between a hand of a worker and a wearing portion at one end portion of a belt.

The wearing portion 20 has a shape in which the wearing portion 20 is wearable by inserting the hand Ph through the wearing portion 20 in a state where the wearing portion 20 is caught on at least one finger (thumb Pf in the embodiment) of the worker P. The whole wearing portion 20 is made of a flexible and durable material (for example, a cloth material or a leather material). That is, as illustrated in FIGS. 7A and 7B, the wearing portion 20 includes a tubular body 21 and a fingerstall portion 22. The tubular body 21 has both front and rear open ends, and the hand Ph (part excluding fingers in the embodiment) of the worker P can be inserted and fitted into the tubular body 21. The fingerstall portion 22 is consecutively disposed on one side portion in the palm side of the tubular body 21, and the thumb Pf of the hand Ph of the worker P can be inserted and fitted into the fingerstall portion 22.

The one end portion 40a of the belt 40 is combined (for example, sewn or bonded) to the outer surface of the tubular body 21 so as to be displaced to the thumb and the index finger side (that is, the far side from the waist part Pw) viewed from the center portion. The combined portion is not limited to that of the embodiment, and for example, the one end portion 40a of the belt 40 may be combined to the outer surface of the tubular body 21 so as to be displaced to the far side from the thumb and the index finger (that is, the side close to the waist part Pw) viewed from the center portion.

Alternatively, the combined portion may be another portion insofar as lifting the heavy object is not obstructed at the portion.

In each drawing of the embodiment, the part of the hand Ph is schematically illustrated because of the three-dimensional complicated shape of the hand Ph. For example, the four fingers other than the thumb are simply illustrated together in a strip plate shape, and only the joints are indicated by a plurality of concavo-convex lines.

Thus, by catching the base of the corresponding finger (in the embodiment, the base portion of the thumb and the index finger) on the boundary between the tubular body 21 and the fingerstall portion 22, the belt 40 can be appropriately drawn out by the hand Ph wearing the wearing portion 20, thus providing the excellent workability.

The fingerstall portion 22 may have a structure in which at least one other finger can be inserted and fitted into the fingerstall portion 22 in addition to or instead of the thumb Pf. While the example in which the fingerstall portion 22 covers the whole thumb Pf is described in the embodiment, a modification in which the distal end of the fingerstall portion 22 is cut and the tip of the thumb Pf is exposed also can be employed.

Now, the winding device R is attachably/detachably fitted on the waist part Pw of the worker P via the fitting portion 10, and especially, in the first embodiment, a pair of right and left winding devices R are mounted and secured to a rear surface of a waist belt 71, which is wound around the waist part Pw of the worker P, so as to be mutually spaced. In this case, the fitting portion 10 includes the waist belt 71 wound around the waist part Pw of the worker P and held on the waist part Pw, and device main bodies Rm (in the embodiment, coupling members 13 described later) of the winding devices R are coupled to the waist belt 71.

Generally, since the method of securing the waist belt by winding it around the waist part is conventionally well-known, the illustration and the description of the structure of attachably/detachably securing the waist belt 71 of the embodiment by winding it around the waist part Pw of the embodiment will be omitted.

A leg belt 75 is connected to the waist belt 71 via a connection belt 76 and a connector 77. The leg belt 75 is configured to be worn on a thigh Pl by inserting at least one of (in the embodiment, both) thighs Pl of the worker P through the leg belt 75. The connection structure may be an attachable/detachable structure or a non-detachable structure.

The work assisting apparatus A of the embodiment further includes a vest 80 as a work jacket that is wearable by the worker P such that the vest 80 covers at least upper portions of shoulders Ps of the worker P. The vest 80 includes front belt guides 81f and a rear belt guide 81r through which the belt 40 slidably passes on the front surface and the rear surface, respectively so as to keep a state where an intermediate portion of the belt 40 is put on the shoulder Ps of the worker P. It is preferred to cover the portion covering the right and left shoulders Ps of the vest 80 (that is, directly sliding portion of the belt 40 in drawing out and winding) with a durable material with which the belt 40 easily slides as necessary.

Figure 1:
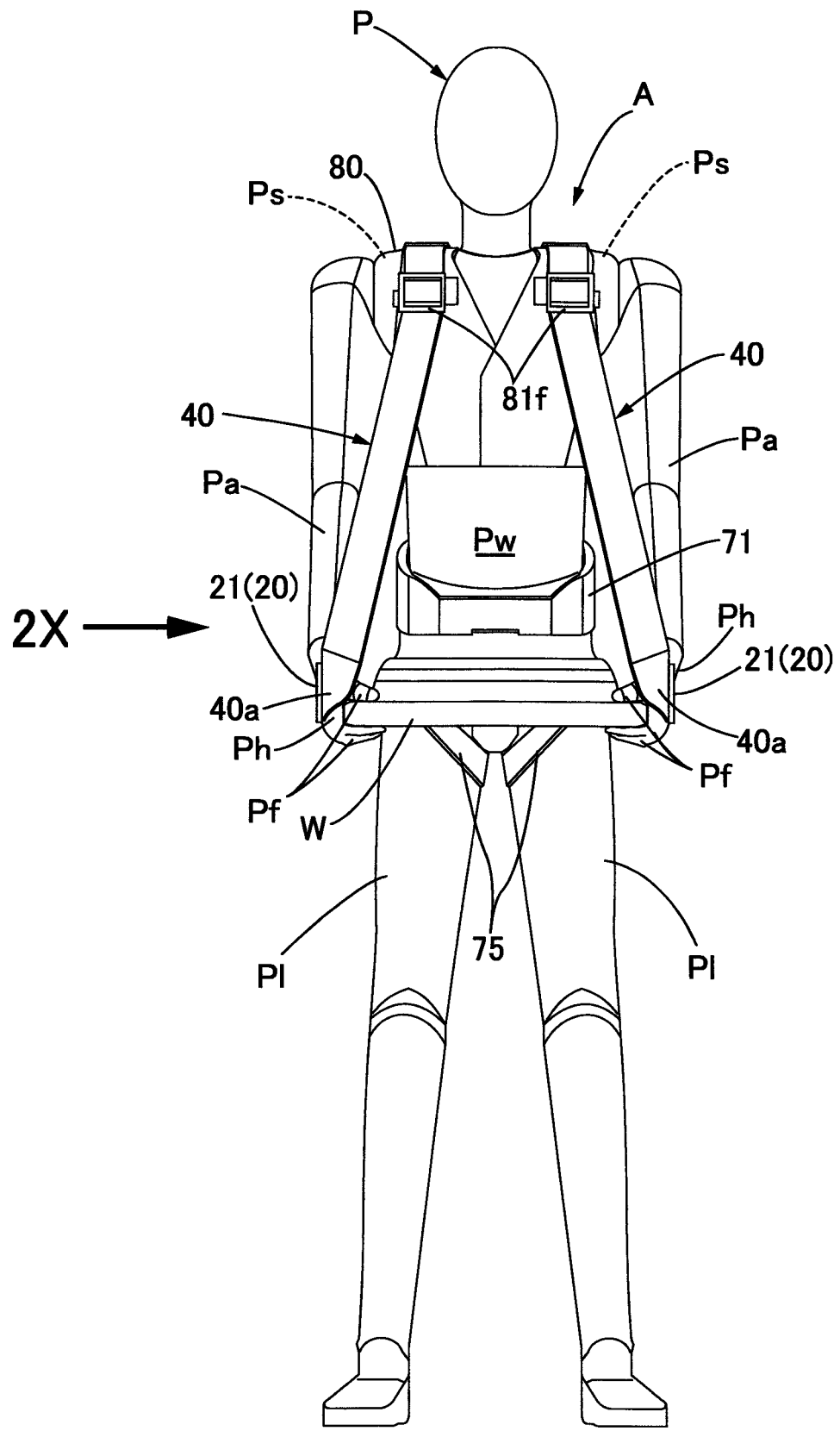
FIG. 1 is a front view illustrating a state where a worker has lifted a heavy object while using a work assisting apparatus according to a first embodiment.
Figure 2:
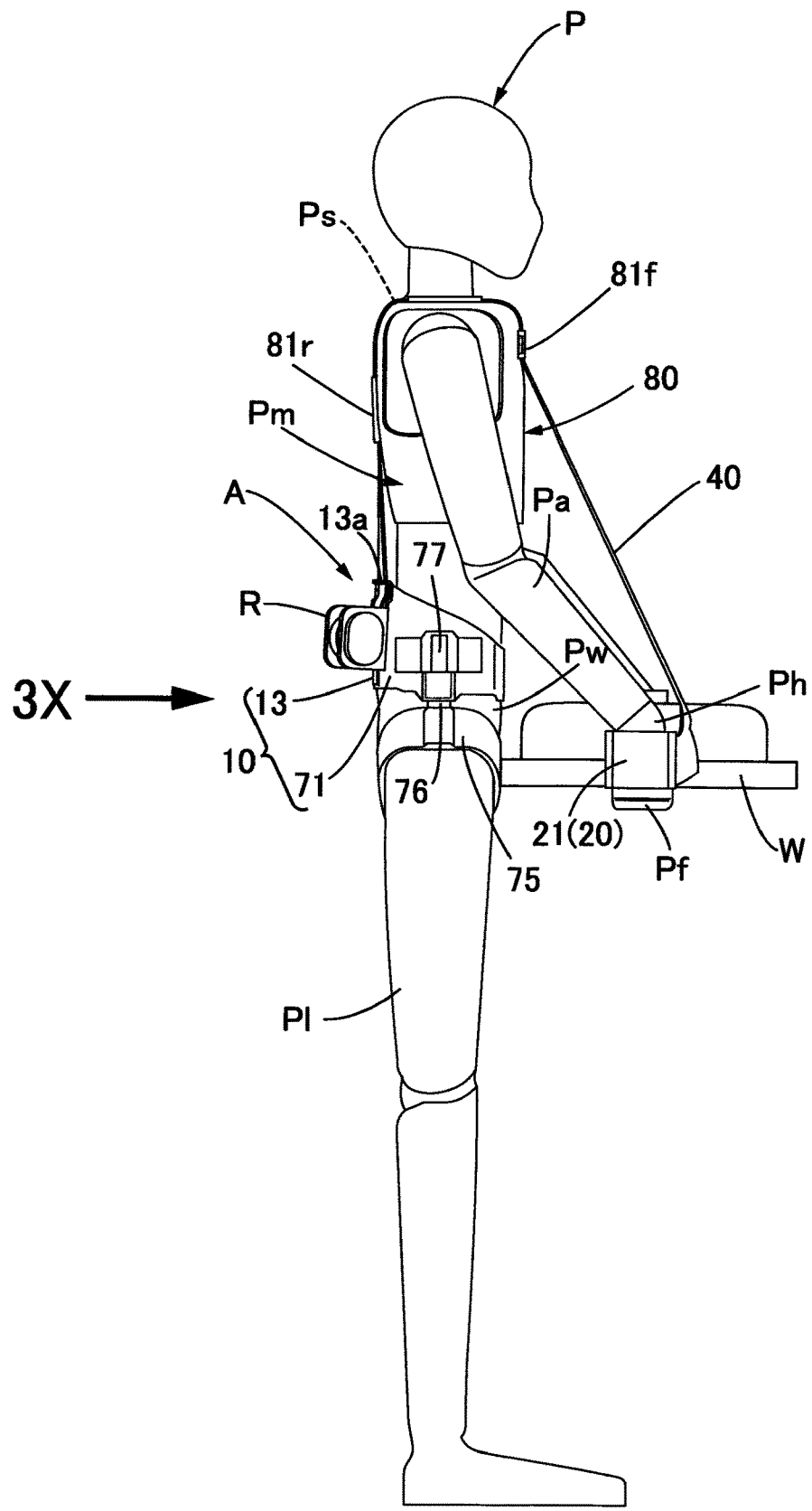
FIG. 2 is a side view illustrating the state (arrow view in the arrow 2X direction of FIG. 1)
Figure 3:
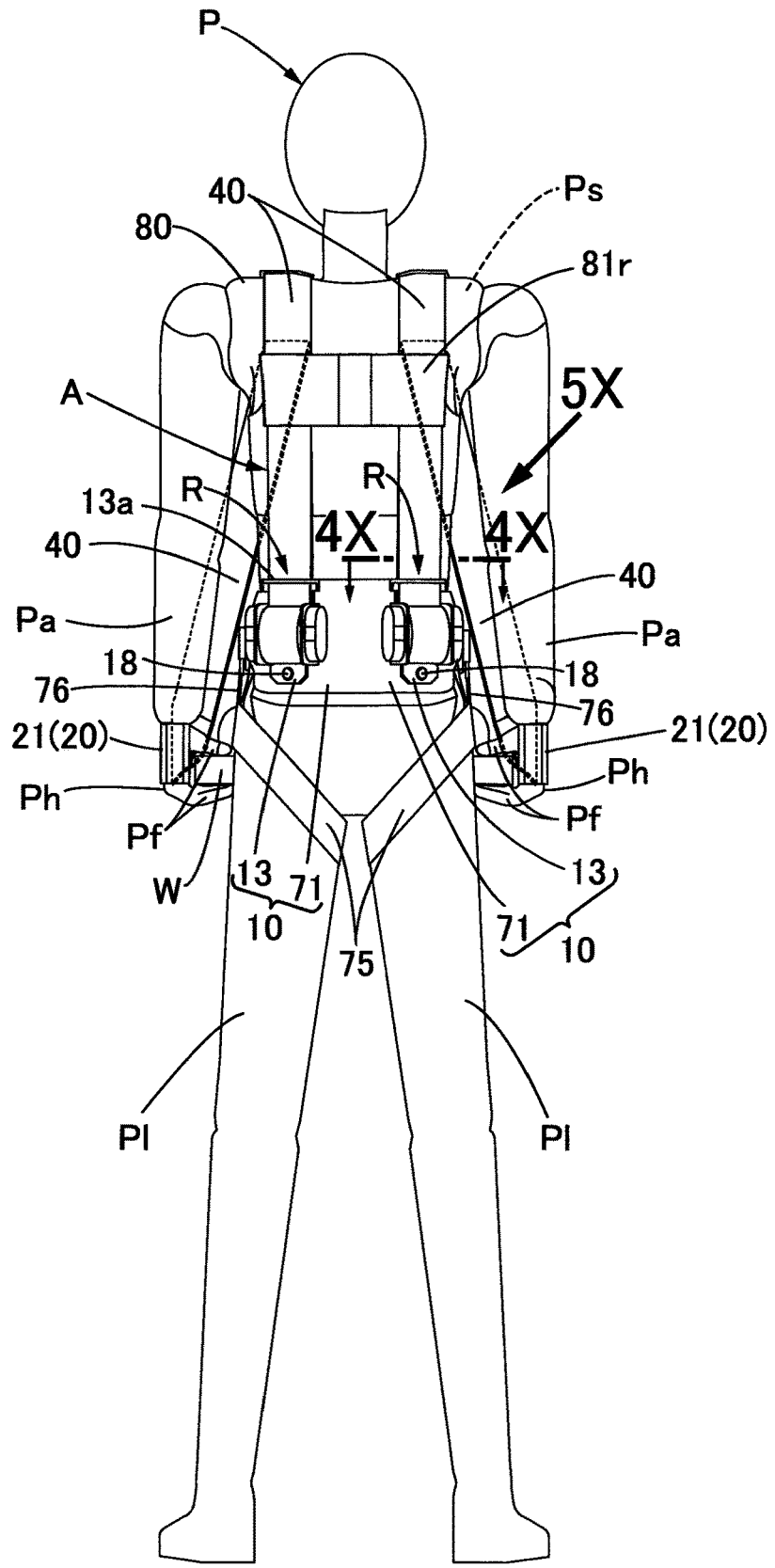
FIG. 3 is a back view illustrating the state (arrow view in the arrow 3X direction of FIG. 2)
Figure 4:
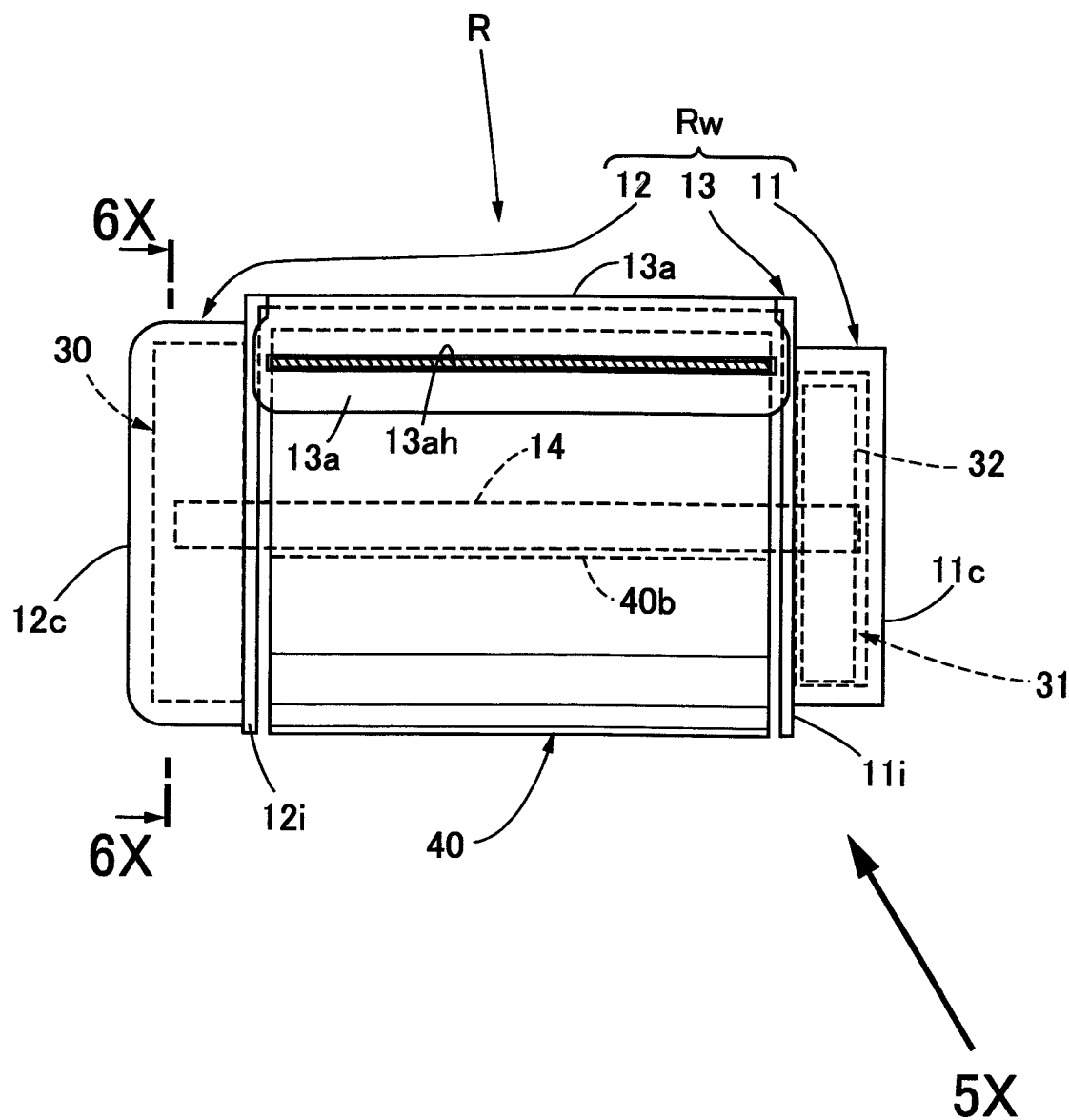
FIG. 4 is a plan view of a winding device (cross-sectional view taken along the line 4X-4X of FIG. 3, arrow view in the arrow 4X direction of FIG. 5)
Figure 5:
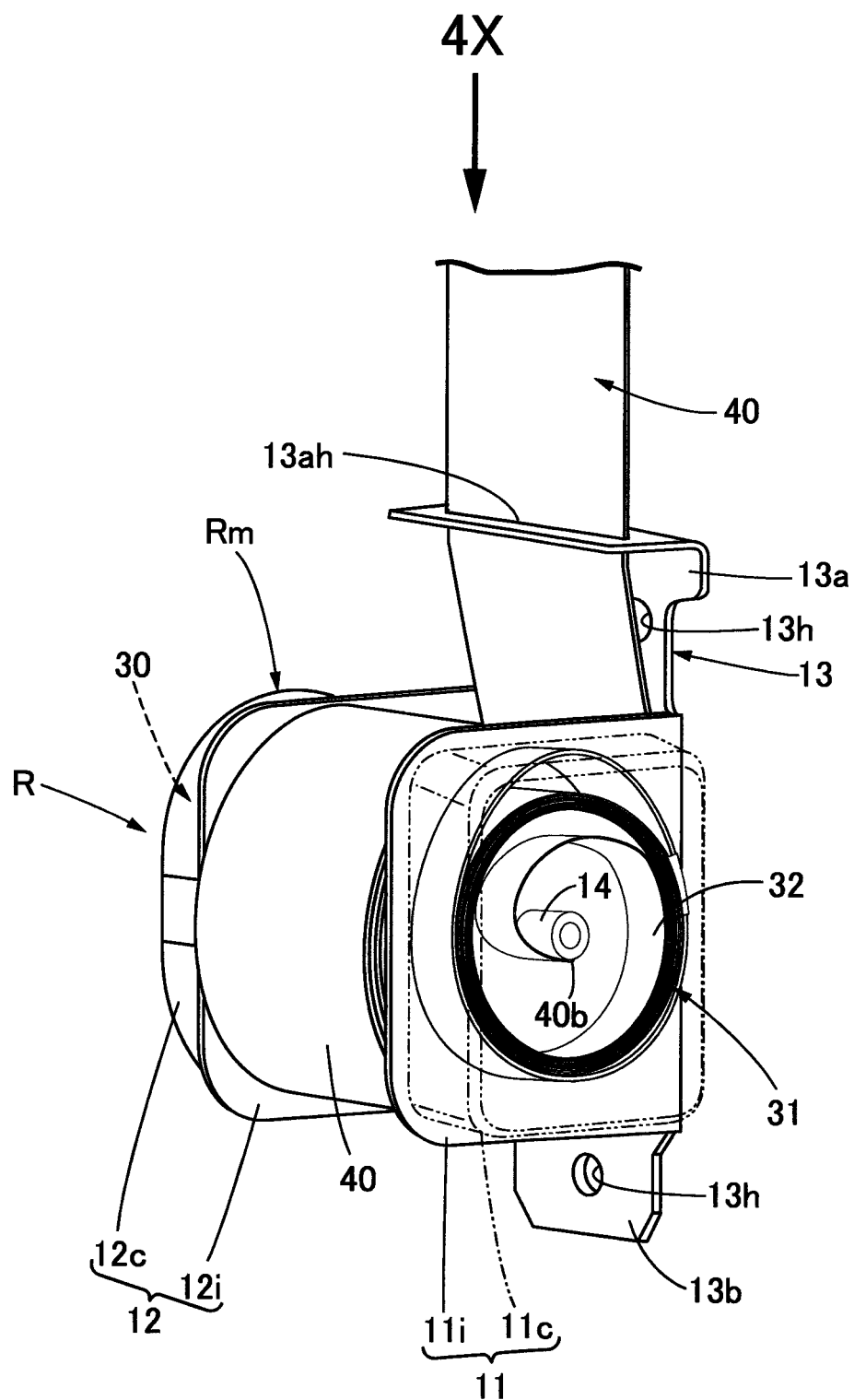
FIG. 5 is a partially broken perspective view of the winding device (partially broken perspective view in the arrow 5X direction of FIGS. 3 and 4)

Next, the winding device R will be specifically described with reference to mainly FIG. 4 to FIG. 6. The device main body Rm of each winding device R includes first and second cases 11, 12 disposed in parallel with an interval slightly wider than the width of the belt 40, and a plate-shaped coupling member 13 integrally combining between one ends of the first and the second cases 11, 12. The device main body Rm is formed in an approximately U shape in plan view. The first and the second cases 11, 12 include inner sidewalls 11i, 12i which are each formed in a flat plate shape and disposed to be mutually parallel, and shallow dish-shaped covers 11c, 12c attachably/detachably combined to the inner sidewalls 11i, 12i via combining means (not illustrated), thus forming each of the first and the second cases 11, 12 as a hollow body.

The coupling member 13 has upper and lower end portions extending outward in the up-down direction with respect to the first and the second cases 11, 12, and extending portions 13a, 13b are provided with coupling holes 13h for the waist belt 71. A coupling shaft 18 (for example, a coupling rivet, a coupling bolt) is inserted through the coupling hole 13h, and the extending portions 13a, 13b are each combined to the waist belt 71 by the coupling shaft 18. Instead of this combining structure, for example, the lower extending portion 13b may be attachably/detachably combined to the waist belt 71 with an attachable/detachable buckle (for example, similar structure to a buckle of a seat belt for an automobile). Thus, the coupling member 13 and the waist belt 71 constitute the fitting portion 10.

In the embodiment, the upper extending portion 13a is laterally bent, and the bent portion is provided with a slit-shaped belt guide hole 13ah through which the belt 40 drawn out from the winding device R slidably passes.

The belt 40 has another end portion 40b combined to a drum shaft 14, and the belt 40 can be wound around the drum shaft 14. Both end portions of the drum shaft 14 penetrate the mutually opposed inner sidewalls 11i, 12i of the first and the second cases 11, 12, and are rotatably supported by the inner sidewalls 11i, 12i. In the first case 11, a biasing mechanism 31 that provides a biasing force in the winding direction to the belt 40 is disposed, and the belt 40 can be drawn out by any draw-out length by pulling the one end portion 40a against the biasing force in the state where the intermediate portion of the belt 40 is slidably put on the shoulder Ps of the worker P.

The biasing mechanism 31 includes a spiral spring 32 as the main part whose center portion is combined to one end of the drum shaft 14, and the spiral spring 32 has another end combined to an outer peripheral inner wall of the first case 11. A repulsive force of the spiral spring 32 provides a rotational biasing force in the winding direction (clockwise direction in FIG. 5, counterclockwise direction in FIG. 6) to the belt 40.

The winding device R includes a lock mechanism 30 in the second case 12. The lock mechanism 30 is configured to lock the draw-out position of the belt 40 so as to restrict the further drawing out when the one end portion 40a of the belt 40 is drawn out by any draw-out length. The lock mechanism 30 is, as described later, connected to an unlocking instruction device C for releasing the lock of the lock mechanism 30 before the start and after the end of the work to be assisted (for example, a work of lifting or holding the heavy object W). Next, the lock mechanism 30 and the unlocking instruction device C will be sequentially described. In this specification below, when it is referred to as simply the "work," it means the work to be assisted insofar as it is not especially mentioned.

The lock mechanism 30 has a structure similar to a conventionally well-known ratchet mechanism, and includes a ratchet gear 35, a locking member 36, a ratchet spring 37, and a bearing member 38. The ratchet gear 35 includes multiple ratchet teeth 35t at regular intervals on the outer periphery, and is concentrically combined to the other end of the drum shaft 14. The locking member 36 includes a lock claw portion 36t engageably/disengageably locked to the ratchet teeth 35t at the distal end. The ratchet spring 37 elastically urges the locking member 36 in the engagement direction (upward in FIG. 6) with the ratchet teeth 35t. The bearing member 38 is secured to the inner sidewall 12i of the second case 12. The bearing member 38 allows a shaft portion 36a of the locking member 36 to be slidably fitted into the bearing member 38 in an engaging/disengaging direction with the ratchet teeth 35t (up-down direction in FIG. 6), and the bearing member 38 supports the shaft portion 36a.

Thus, the locking member 36 is usually held at a lock position with the ratchet teeth 35t by a repulsive force of the ratchet spring 37, and in this state, while the rotation in a belt winding direction of the drum shaft 14 (counterclockwise direction in FIG. 6) is allowed, the rotation in a belt draw-out direction (clockwise direction in FIG. 6) is restricted, thereby restricting the further drawing out of the belt 40 (that is, the lock of the lock mechanism 30 is activated).

Meanwhile, when the locking member 36 is pulled in an unlocking direction (downward in FIG. 6) away from the ratchet teeth 35t by the unlocking instruction device C, the lock between the lock claw portion 36t and the ratchet teeth 35t is released (that is, the lock of the lock mechanism 30 is released), and according to the release, the ratchet gear 35, accordingly, the drum shaft 14 becomes free to rotate in the draw-out direction. Accordingly, the belt 40 can be drawn out to any draw-out position against the winding biasing force of the biasing mechanism 31.

Figure 6:
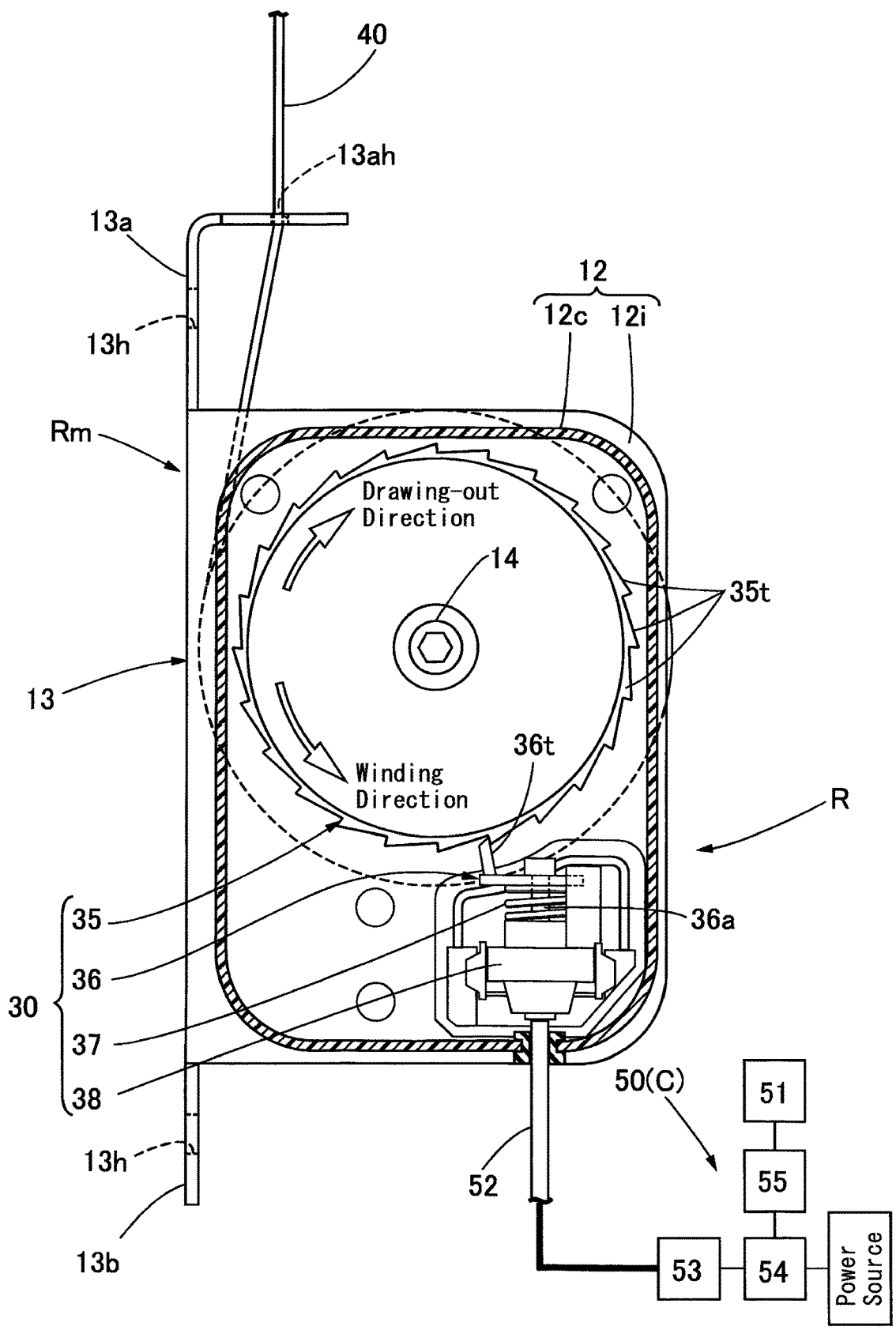
FIG. 6 is a cross-sectional view illustrating a main part of a lock mechanism and an unlocking instruction device in the winding device (cross-sectional view taken along the line 6X-6X of FIG. 4)

The ratchet teeth 35t are formed in teeth shapes in which even in a case where the locking member 36 is held at the lock position, when the one end portion 40a of the belt 40 is operated in the winding direction and the drum shaft 14 rotates in the counterclockwise direction in FIG. 6, the lock claw portion 36t slides on the ratchet teeth 35t, thereby allowing the smooth winding.

The unlocking instruction device C is a device for releasing the lock of the lock mechanism 30 before the start and after the end of the work to be assisted, and in the first embodiment, the unlocking instruction device C is configured by an automatic unlocking instruction device 50 that automatically releases the lock of the lock mechanism 30 before the start and after the end of the work based on a detection result by a detector 51 configured to detect a change of a contact surface pressure or a relative distance between the wearing portion 20 and the heavy object W before and after the start and before and after the end of the work.

The automatic unlocking instruction device 50 includes the detector 51, an operation wire rope 52, an electrical actuator 53, a normally open switch 54, and a controller 55. The operation wire rope 52 is made of a Bowden cable in which one end of an inner wire is combined to the shaft portion 36a of the locking member 36. The electrical actuator 53 is linked and coupled with the other end of the inner wire of the operation wire rope 52, and configured to drive to pull the locking member 36 in the unlocking direction (that is, a direction of releasing the lock of the lock mechanism 30) when current is applied. The normally open switch 54 opens and closes an energizing circuit of the actuator 53. The controller 55 performs an open/close control of the switch 54 based on the detection result of the detector 51.

The controller 55 includes a power switch configured to perform an ON operation as needed (for example, when the work assisting apparatus A is used) although not illustrated, and is connected to a power source (for example, battery). The controller 55 is activated by the ON operation to the power switch. Thus, in the activated state of the controller 55, before the start and after the end of the work to be assisted, the controller 55 releases the lock of the lock mechanism 30 by turning on the switch 54 (accordingly, energizing the actuator 53) based on the detection result of the detector 51 at this time. Meanwhile, from the start to the end of the work, the controller 55 activates the lock of the lock mechanism 30 by turning off the switch 54 (accordingly, turning the actuator 53 to non-energization) based on the detection result of the detector 51 at this time.

When the detector 51 is configured to especially detect the change of the contact surface pressure between the wearing portion 20 and the heavy object W before and after the start and before and after the end of the work, the detector 51 is disposed at a portion in which the change of the contact surface pressure can be detected (for example, inner side portion of the tubular body 21 of the wearing portion 20). When the detector 51 is configured to especially detect the change of the relative distance between the wearing portion 20 and the heavy object W before and after the start and before and after the end of the work, the detector 51 is disposed at a portion in which the change of the relative distance can be detected.

Next, the operation of the first embodiment will be described with reference to mainly FIG. 8 to FIG. 12.

Figure 8:
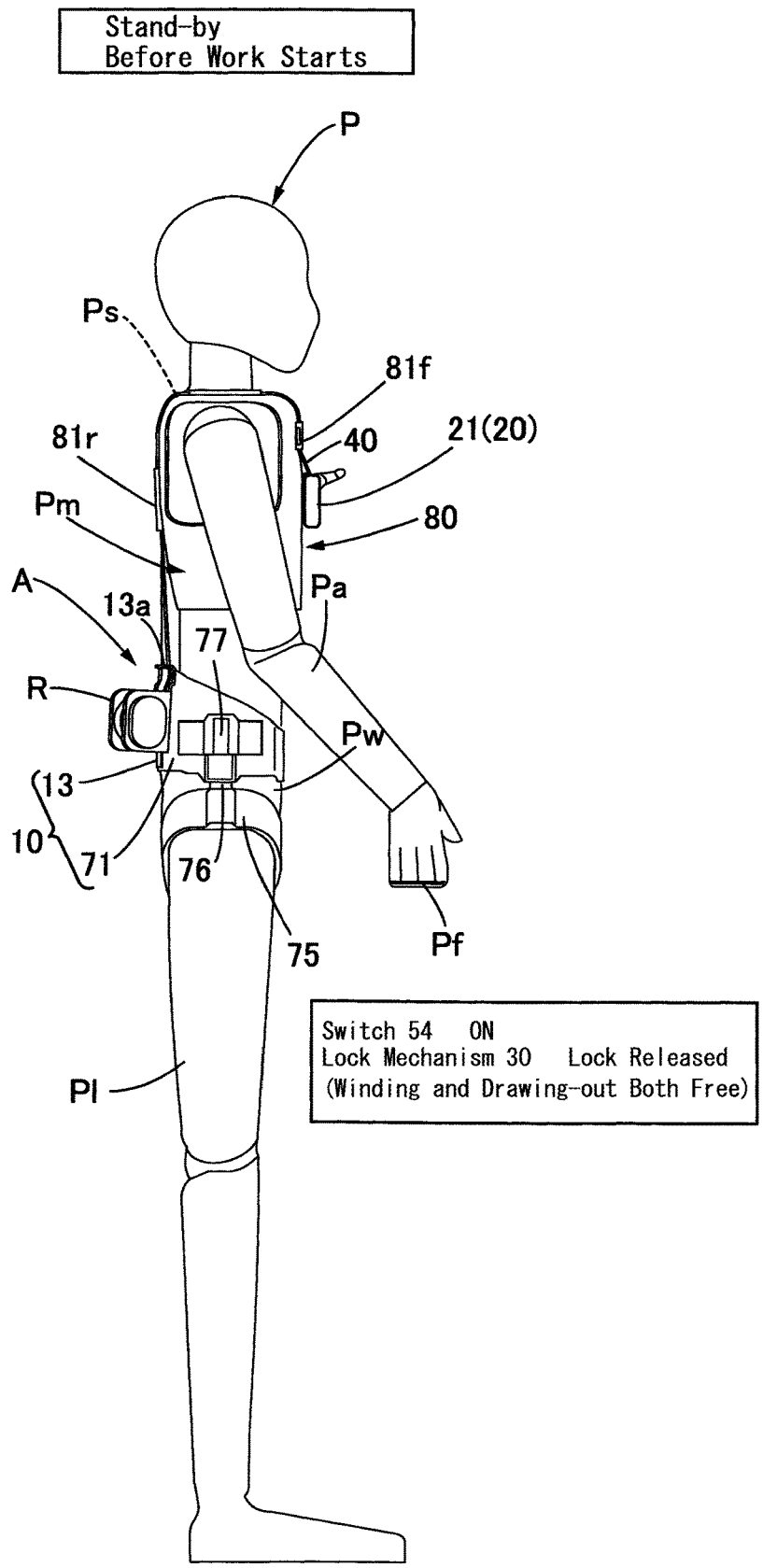
FIG. 8 is a side view illustrating a standby state before starting a work to be assisted (the wearing portion is not yet worn on the hand) viewed from the same side as FIG. 2.

FIG. 8 illustrates a state where the work has not been performed yet immediately after the work assisting apparatus A is set to the worker P. That is, the waist belt 71 and the leg belt 75 are wound around and held on the waist part Pw and the thigh Pl of the worker P, respectively, and the vest 80 is worn on the upper body of the worker P. Then, the belts 40 extending from the winding devices R are put on the shoulders Ps over the vest 80, and turn to extend forward and downward. The intermediate portions of the belts 40 are passed through the rear belt guide 81r and the front belt guides 81f of the vest 80. At this time, the belts 40 are held at initial draw-out positions, that is, standby positions, and therefore, the wearing portions 20 secured to the one end portions 40a of the belts 40 also wait at initial positions (position of FIG. 8).

Figure 9:
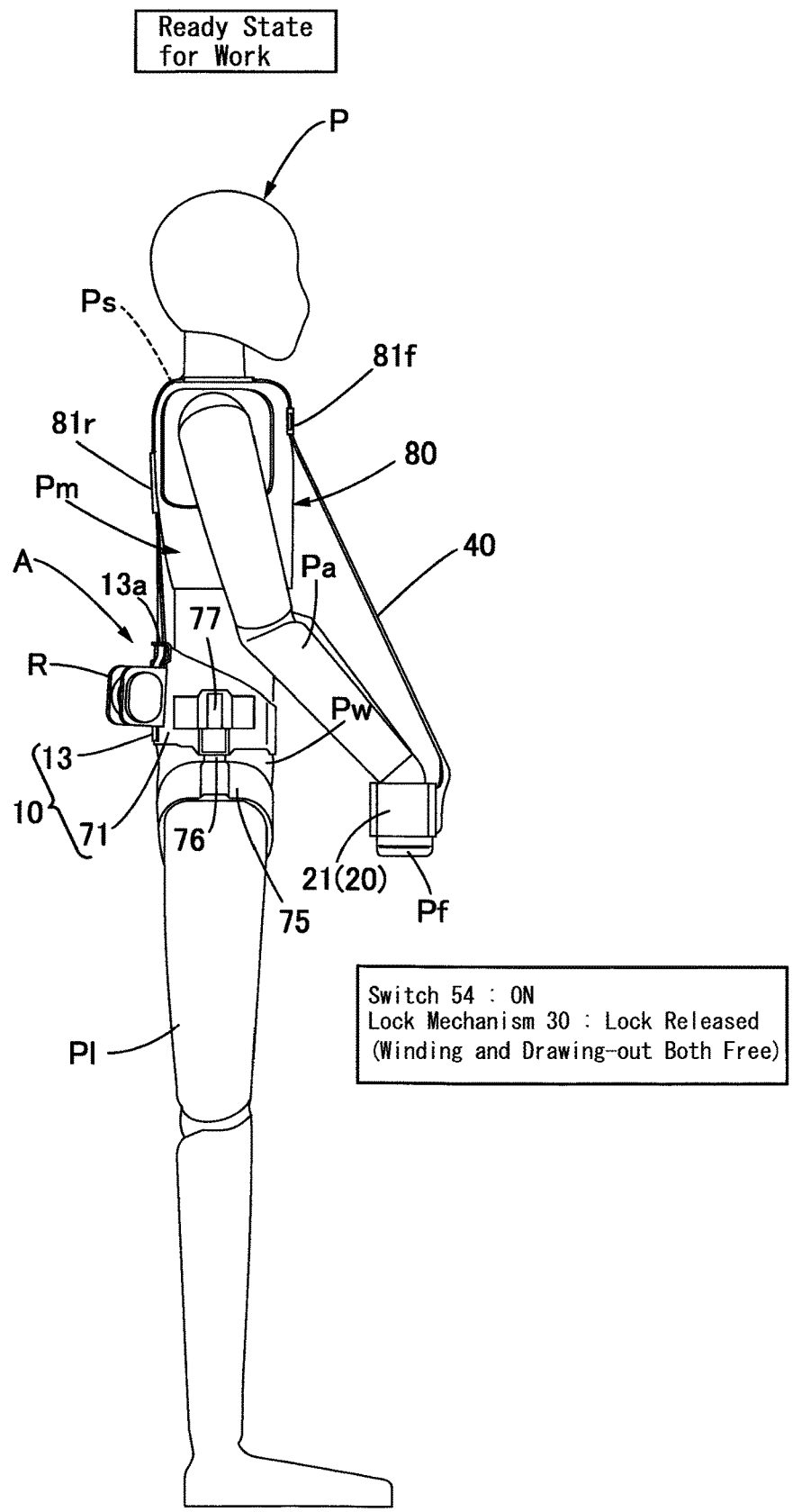
FIG. 9 is a side view illustrating a ready state of the work to be assisted (immediately after wearing the wearing portion on the hand) corresponding to FIG. 8.

For example, when the controller 55 of the automatic unlocking instruction device 50 is activated from this standby state, the lock of the lock mechanism 30 is released by turning on the switch 54 (accordingly, energizing the actuator 53) based on the detection result of the detector 51 (that is, the contact surface pressure between the heavy object W and the wearing portion 20 has not been detected). Therefore, the winding device R becomes free to perform either of winding and drawing out of the belt 40 in this state (see FIG. 8). Then, the worker P appropriately draws out the one end portion 40a of the belt 40 to wear the wearing portion 20 on the hand Ph as illustrated in FIG. 9.

Figure 10:
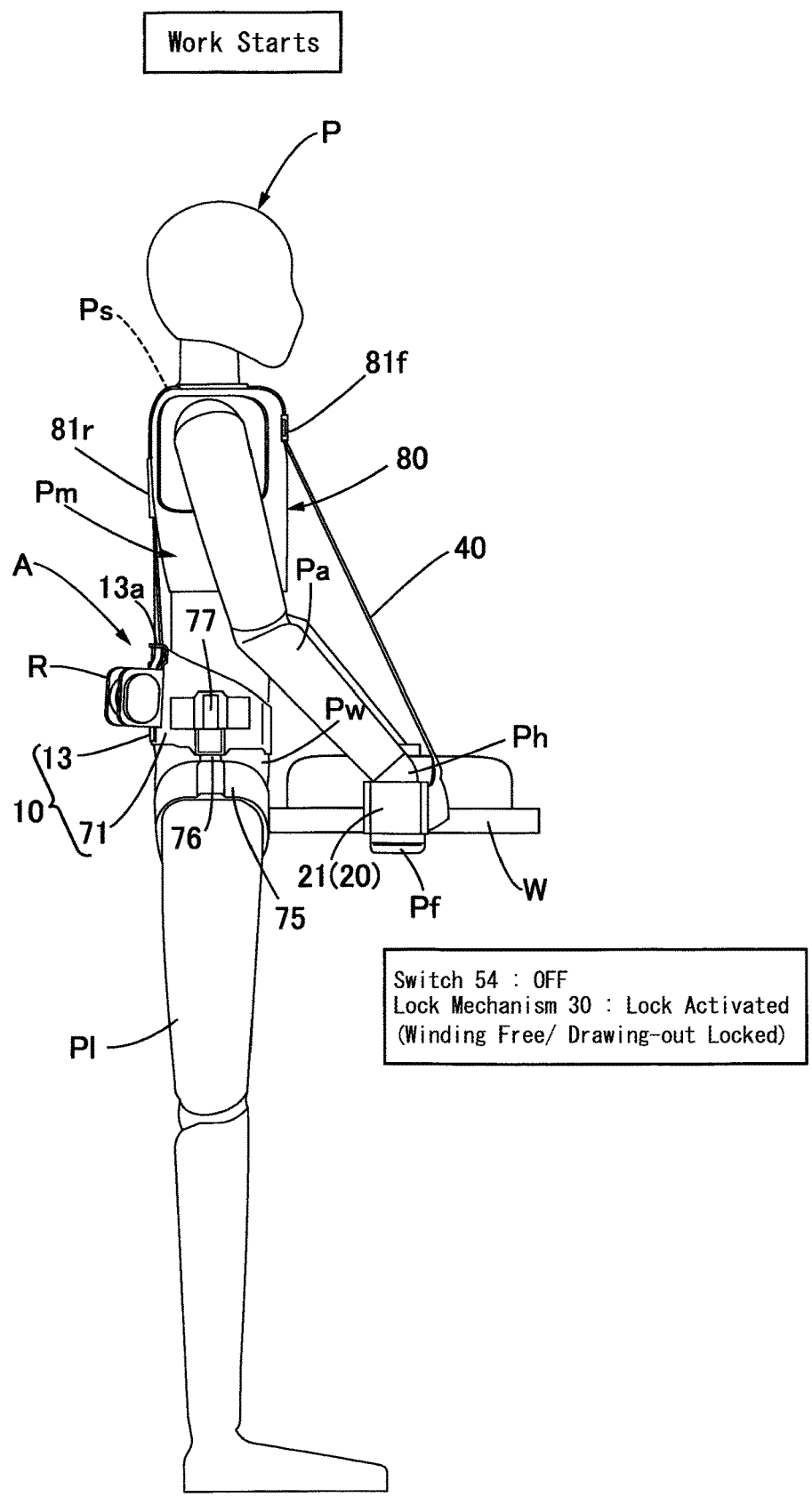
FIG. 10 is a side view illustrating a state immediately after starting the work to be assisted (the hand grips a heavy object) corresponding to FIG. 8.

Thus, in the state where the intermediate portion of the belt 40 is put on the shoulder Ps, the one end portion side of the belt 40 can be drawn out up to a desired draw-out length optimal for grasping the heavy object W, and the heavy object W can be easily grasped in the state of drawing out the belt 40 as illustrated in FIG. 10. Then, when the detector 51 detects the rapid increase of the contact surface pressure between the heavy object W and the wearing portion 20 at the grasp of the heavy object W, the controller 55 turns off the switch 54 (that is, turns the actuator 53 to the non-energization state) based on the detection result, thereby activating the lock of the lock mechanism 30.

Therefore, the winding device R restricts the further drawing out of the belt 40, that is, the draw-out length of the belt 40 is held at the length optimal for grasping the heavy object W, thus providing a support configuration in which the worker P only needs to grasp the heavy object W with the hand Ph for hanging the heavy object W with the belt 40 put on the shoulder Ps to apply its weight to not only the arm Pa but also the shoulder Ps and the waist part Pw. Accordingly, by simply raising or moving the upper body of the worker P while keeping the state of hanging the heavy object W, the work of lifting or holding the heavy object W can be more lightly performed.

Figure 11:
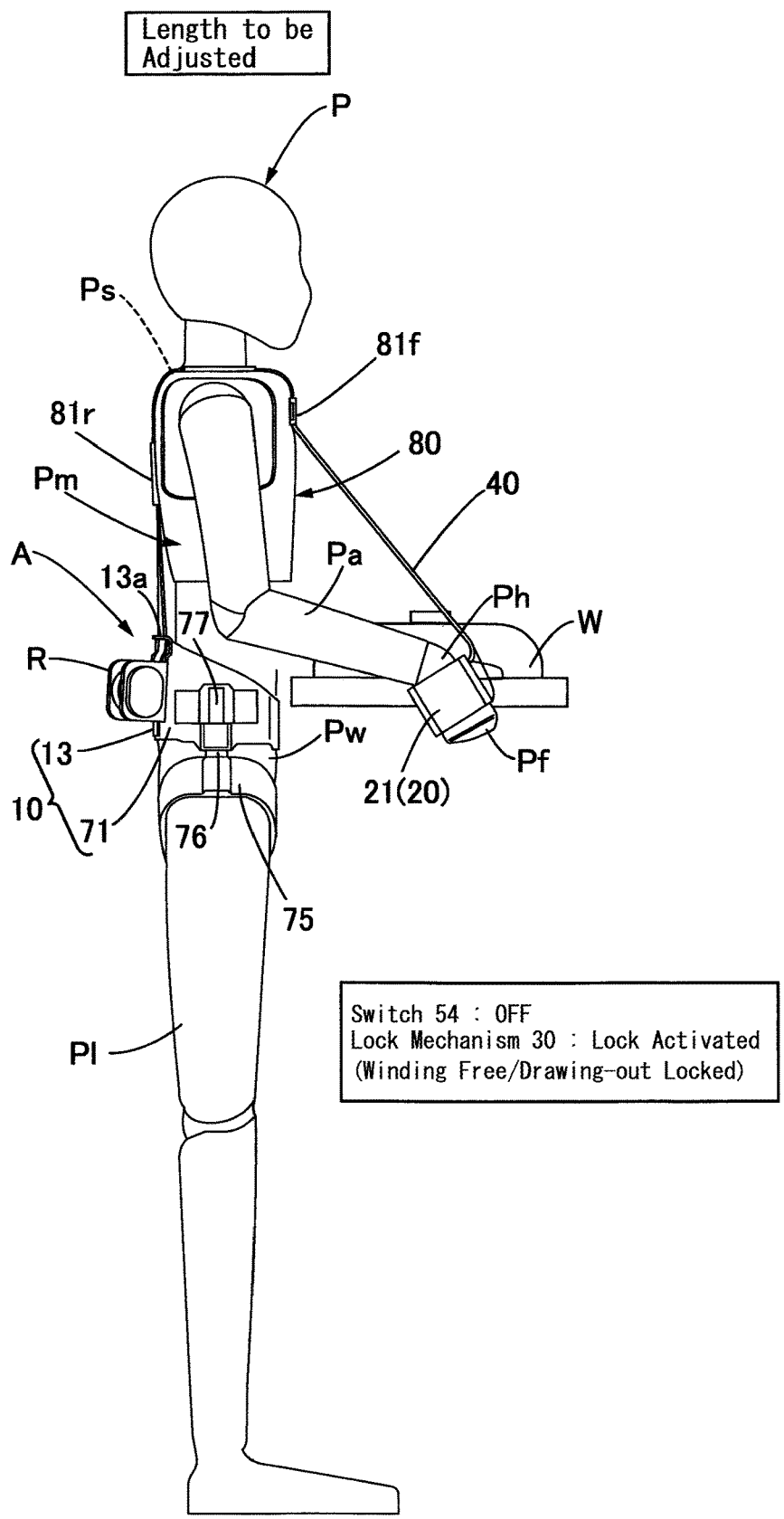
FIG. 11 is a side view illustrating a state immediately after adjusting a belt length during the work to be assisted corresponding to FIG. 8.

Even during the above-described work, the winding device R remains to be free to wind the belt 40. Therefore, for example, as illustrated in FIG. 11, when the worker P moves the hands Ph by any height as needed while grasping the heavy object W with the hands Ph, while the belts 40 are automatically wound up by the winding devices R by the amount of the height (that is, the draw-out length of the belt 40 is adjusted to the shortening side), the drawing out of the belts 40 is continued to be restricted because the lock mechanism 30 remains in the state where the lock is activated.

Figure 12:
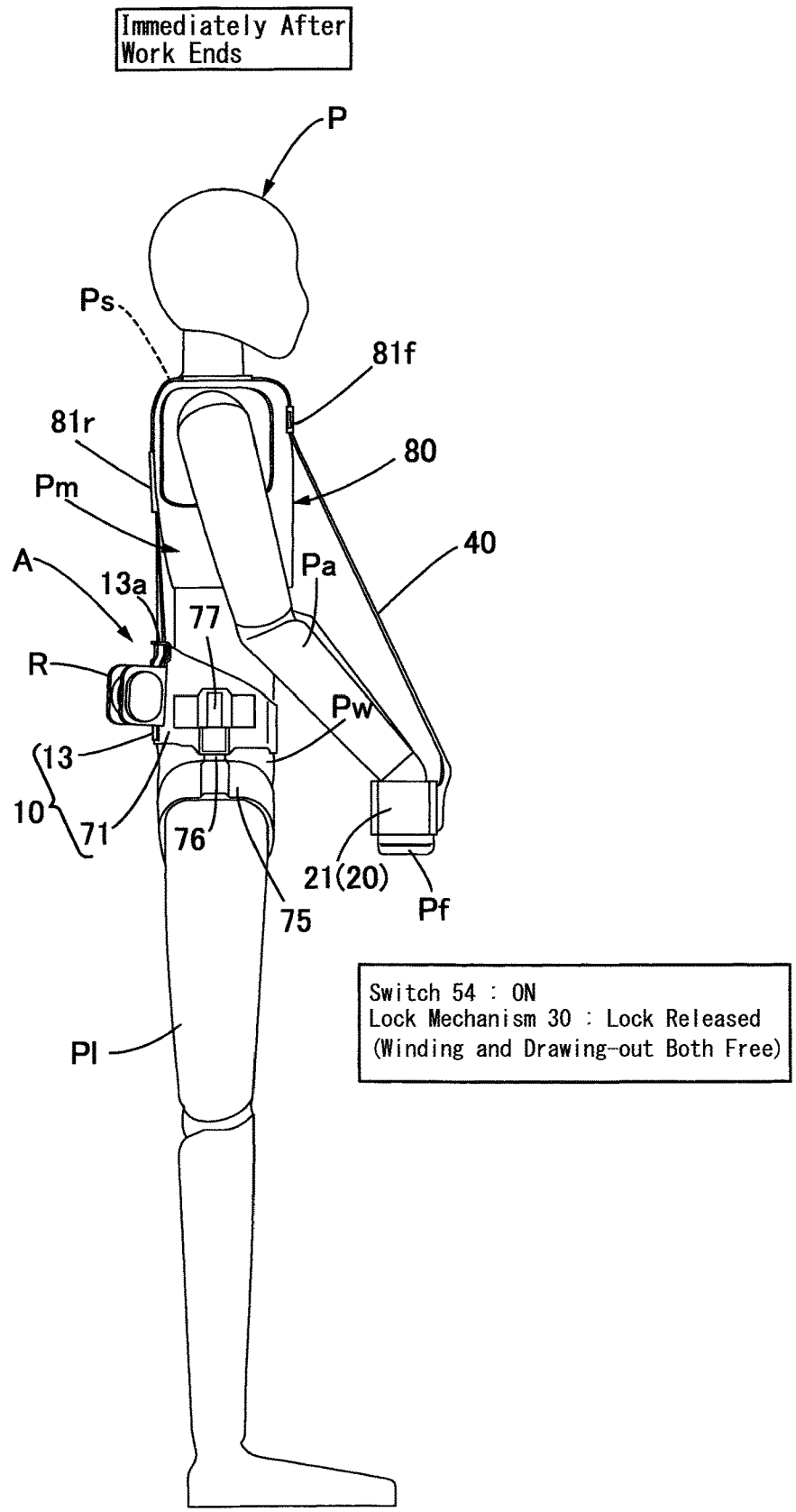
FIG. 12 is a side view illustrating a state immediately after the end of the work to be assisted (immediately after releasing the heavy object) corresponding to FIG. 8.

Next, when the work ends and the worker P rereleases the heavy object W as illustrated in FIG. 12, the contact surface pressure between the heavy object W and the wearing portion 20 rapidly decreases or becomes zero. At this time, by turning on the switch 54 again (accordingly, energizing the actuator 53) based on the detection result of the detector 51 that has detected the state, the lock of the lock mechanism 30 is released, and accordingly, the winding device R becomes free to perform either of winding and drawing out of the belt 40.

Thus, by removing the wearing portion 20 from the hand Ph of the worker P, the belt 40 is automatically wound up to the standby position illustrated in FIG. 8 by the winding device R. Then, when the activation of the controller 55 is stopped, the operation of the work assisting apparatus A stops.

As described above, the work assisting apparatus A of the embodiment includes the fitting portion 10, the wearing portion 20, the belt 40, and the winding device R. The fitting portion 10 is configured to be fitted on the torso Pm of the worker P. The wearing portion 20 is configured to be worn on the arm Pa or the hand Ph of the worker P. The belt 40 has the one end portion 40a combined to the wearing portion 20. The winding device R is coupled to the fitting portion 10, and configured to wind the other end side of the belt 40. The winding device R includes the biasing mechanism 31 and the lock mechanism 30. The biasing mechanism 31 provides a biasing force in the winding direction to the belt 40. The lock mechanism 30 is configured to lock the draw-out position of the belt 40 so as to restrict the further drawing out when the one end portion 40a of the belt 40 is drawn out by any draw-out length.

Accordingly, the one end portion 40a of the belt 40 drawn out from the winding device R fitted on the torso Pm of the worker P, that is, the wearing portion 20 is worn on the arm Pa or the hand Ph of the worker P, and in this state, when the worker P appropriately draws out the belt 40 to grasp the heavy object W with the hand Ph, and activates the lock of the lock mechanism 30 to restrict the further drawing out of the belt 40, the worker P can transfer a part of the load applied to the arm Pa or the hand Ph to the torso Pm via the belt 40 and the winding device R in the work of lifting or holding the heavy object W with the hand Ph. Therefore, the load of the work is reduced by its amount, and the work can be effectively supported and assisted.

Since the winding device R can provide the above-described effect of work assist with the light and simple configuration that simply restricts the draw-out length of the belt 40 by the lock mechanism 30, the need for the large-sized rigid frame or the luggage lifting actuator linked to the winding device R is eliminated, thus the cost reduction and the reduction of the load on the worker P are achieved. Moreover, the winding device R is exclusively used for restricting the drawing out of the belt during the work, and the belt 40 can be wound up as needed not only during the work but also before the work start and after the work end. Therefore, a concern that the belt 40 hinders the normal behavior while not working, or a concern that another object is improperly caught in or wound around the belt 40 is eliminated, and the belt length can be adjusted without obstruction before the work start or during the work.

Especially, the winding device R of the embodiment is fitted on the waist part Pw of the worker P via the fitting portion 10 such that the intermediate portion of the belt 40 drawn out from the winding device R is slidably put on the shoulder of the worker P. This provides a unique support configuration in which in the above-described work assist, while the winding device R is coupled to and supported by the waist part Pw of the worker P, the intermediate portion of the belt 40 drawn out from the winding device R passes on the shoulder Ps of the worker P, and the arm Pa or the hand Ph of the worker P is hanged via the one end portion side of the belt 40. Accordingly, not only the winding device R fitted near the waist part Pw can reduce the possibility of hindering the work, but also the gravitational force acting on the belt 40 during the work assist is appropriately distributed to not only the arm Pa but also the waist part Pw, the shoulder Ps, and their peripheries of the worker P in a balanced manner Therefore, the load on the worker P can be reduced by its amount.

Further, the lock mechanism 30 of the embodiment is connected to the unlocking instruction device C that releases the lock of the lock mechanism 30 before the start and after the end of the work. Therefore, before the start and after the end of the work, by releasing the lock of the lock mechanism 30 by the unlocking instruction device, the draw-out length of the belt 40 from the winding device can be easily adjusted to any length. Accordingly, before the start and after the end of the work, the wearing portion 20 of the one end portion 40a of the belt 40 can be smoothly worn on or removed from the arm Pa or the hand Ph of the worker P, and the heavy object W can be smoothly grasped with the hand Ph in the state where the wearing portion 20 is worn on the arm Pa or the hand Ph without hindrance by the winding device R.

The unlocking instruction device C of the embodiment is the automatic unlocking instruction device 50. The automatic unlocking instruction device 50 automatically releases the lock of the lock mechanism 30 before the start and after the end of the work, and activates the lock of the lock mechanism 30 after the start to the end of the work based on the detection result by the detector 51 configured to detect the change of the contact surface pressure or the relative distance between the wearing portion 20 and the heavy object W before and after the start and before and after the end of the work to be assisted.

The wearing portion 20 of the embodiment has a shape in which the wearing portion 20 is wearable by inserting the hand Ph through the wearing portion 20 in a state where the wearing portion 20 is caught on at least one finger of the worker P. Therefore, by inserting the hand Ph through the wearing portion 20 in the state where the finger (for example, the base of the finger) is caught on the wearing portion 20 in getting ready for the work, the belt 40 can be easily and appropriately drawn out using the hand Ph, thereby enhancing the work efficiency.

The fitting portion 10 of the embodiment includes the waist belt 71 wound around the waist part Pw of the worker P and held on the waist part Pw, and the winding device R is coupled to the waist belt 71. Accordingly, since the reactive force acting on the winding device R in assisting the work of lifting or holding the heavy object W can be widely dispersed from the waist belt 71 to the waist part Pw and its periphery, the load on the waist part Pw is reduced. Moreover, since an appropriate pressure is applied to the abdomen by the waist belt 71, an abdominal pressure is increased, thus allowing the contribution to the reduction of the load on the lumbar spine.

Furthermore, since the waist belt 71 of the embodiment is connected to the leg belt 75 configured to be worn on the thigh Pl by inserting at least one of the thighs Pl of the worker P through the leg belt 75, moving upward of the winding device R itself in lifting the heavy object W can be suppressed. Therefore, the winding device R can be effectively used at the appropriate position.

Additionally, the work assisting apparatus A of the embodiment includes the vest 80 as a work jacket that is wearable by the worker P such that the vest 80 covers at least upper portions of the shoulders Ps of the worker P. The vest 80 includes the belt guides 81f, 81r through which the belt 40 slidably passes so as to keep the state where the intermediate portion of the belt 40 is put on the shoulder Ps of the worker P. Accordingly, while the belt 40 can be smoothly drawn out by the belt guides 81f, 81r, the state where the intermediate portion of the belt 40 is put on the shoulder Ps of the worker P can be appropriately kept, thus enhancing the work efficiency.

Figure 13A:
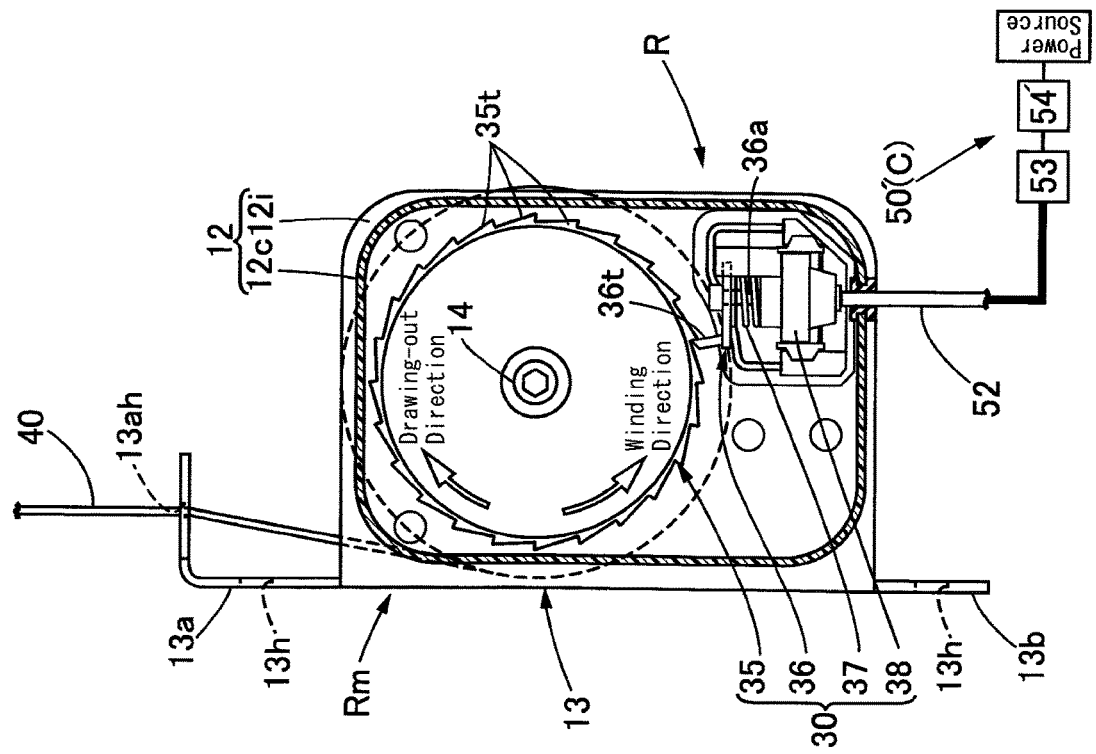
FIGS. 13A and 13B are cross-sectional views illustrating a main part of a winding device according to a second embodiment corresponding to FIG. 6, especially.
Figure 13B:
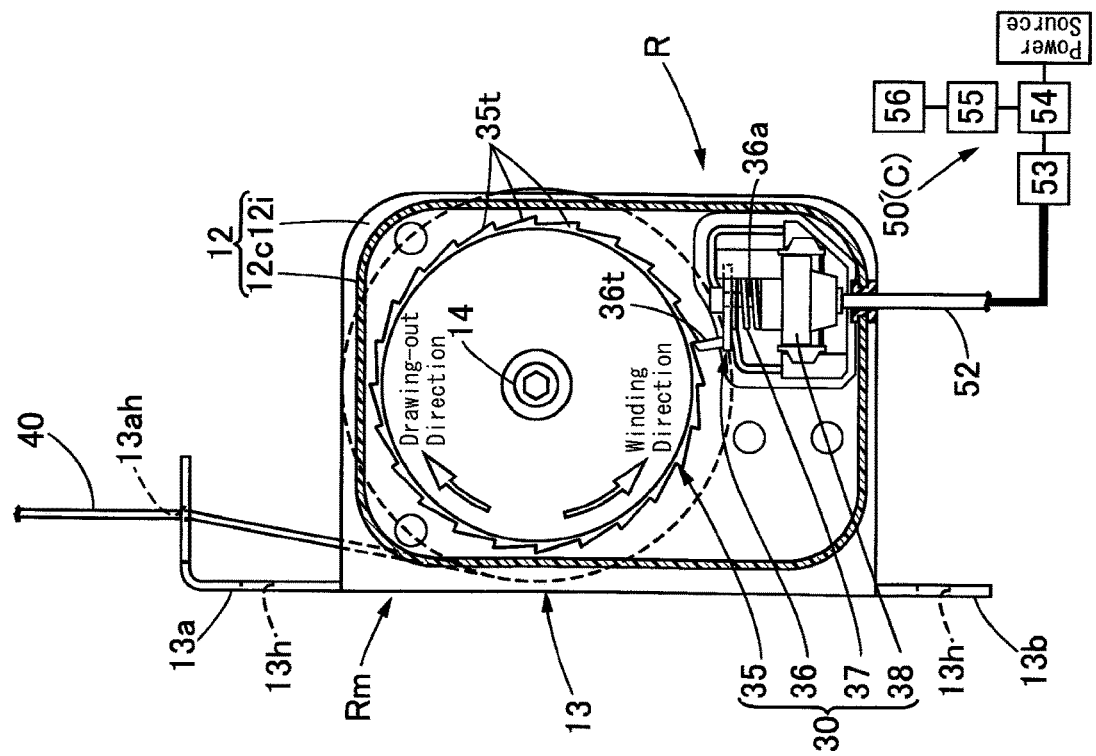

FIGS. 13A and 13B illustrate a main part of a second embodiment. The first embodiment describes the configuration in which the unlocking instruction device C for releasing the lock of the lock mechanism 30 is the automatic unlocking instruction device 50 (that is, the lock of the lock mechanism 30 is automatically released before the start and after the end of the work based on the detection result by the detector 51 configured to detect the change of the contact surface pressure or the relative distance between the wearing portion 20 and the heavy object W before and after the start and before and after the end of the work to be assisted). Meanwhile, the second embodiments describes a configuration in which the unlocking instruction device C is a manual unlocking instruction device 50' (that is, the lock of the lock mechanism 30 is released as needed based on an operation input to an unlock operation device configured to be manually operated as necessary).

More specifically, as illustrated in FIG. 13A, similarly to the automatic unlocking instruction device 50, the manual unlocking instruction device 50' includes an operation wire rope 52, an electrical actuator 53, a switch 54, and a controller 55. The operation wire rope 52 is made of a Bowden cable in which one end of an inner wire is combined to the shaft portion 36a of the locking member 36. The electrical actuator 53 is linked and coupled with the other end of the inner wire of the operation wire rope 52, and configured to drive to pull the locking member 36 in the unlocking direction (that is, a direction of releasing the lock of the lock mechanism 30) when current is applied. The switch 54 opens and closes an energizing circuit of the actuator 53. The controller 55 performs an open/close control of the switch 54. However, the controller 55 is configured to be linked with a remote control device 56 as an unlock operation device instead of the detector 51 in the first embodiment.

For the remote control device 56, disposing its operation unit at hand of the worker P (for example, the appropriate position of the wearing portion 20) provides an excellent operability. The remote control device 56 may be configured to be linked with the controller 55 by wired or wireless communicating means.

Thus, before the start and after the end of the work to be assisted, the manual unlocking instruction device 50' can release the lock of the lock mechanism 30 through an unlocking operation on the remote control device 56 by the worker P to turn on the switch 54 (accordingly, energizing the actuator 53). Meanwhile, from the start to the end of the work, the manual unlocking instruction device 50' can activate the lock of the lock mechanism 30 through an unlock-disabling operation on the remote control device 56 by the worker P to turn off the switch 54 (accordingly, turning the actuator 53 to non-energization).

While the features different from the first embodiment have been described for the second embodiment, other configurations of the second embodiment are basically the same as the first embodiment. Therefore, for the components of the second embodiment, the reference numerals the same as those of the corresponding components of the first embodiment are simply attached, and the further specific descriptions will be omitted.

The second embodiment can basically achieve the operational advantages similar to the operational advantages of the first embodiment excluding that the switching of the unlocking instruction device C for releasing the lock of the lock mechanism 30 is performed based on a manual operation on the unlock operation device (that is, the remote control device 56).

FIG. 13B illustrates a first modification of the manual unlocking instruction device 50'. In the first modification, the remote control device 56 and the controller 55 of the second embodiment are omitted. The first modification is configured such that a switch 54' is directly opened and closed as needed by hand to open and close an energizing circuit of the actuator 53 as needed, thereby selectively releasing the lock or activating the lock of the lock mechanism 30 as necessary. In the first modification, the switch 54' configured to be directly opened and closed by hand constitutes the unlock operation device.

Although not illustrated, as a second modification of the manual unlocking instruction device 50', a configuration in which the lock of the lock mechanism 30 is released by mechanically and directly driving to pull the inner wire of the operation wire rope 52 by an unlock operation lever configured to be manually operated as needed can be employed. In the second modification, in addition to the controller 55, the actuator 53, and the switches 54, 54', the power source also can be omitted, and the unlock operation lever functions as the unlock operation device. In the second modification, by disposing a holding mechanism configured to hold the unlock operation lever at the position of driving to pull the inner wire of the operation wire rope 52 as needed, even in a state where the hand is released from the unlock operation lever, the lever can be held at the position of driving to pull the inner wire for any period.

Thus, in the first and the second modifications of the manual unlocking instruction device 50', the lock of the lock mechanism 30 can be released as needed based on the operation input to the unlock operation device (the switch 54', the unlock operation lever) configured to be manually operated as necessary. That is, similarly to the second embodiment, before the start and after the end of the work to be assisted, the lock of the lock mechanism 30 can be released through an unlocking operation on the unlock operation device by the worker P, and meanwhile, from the start to the end of the work, the lock of the lock mechanism 30 can be activated through an unlock-disabling operation on the unlock operation device.

Figure 14:
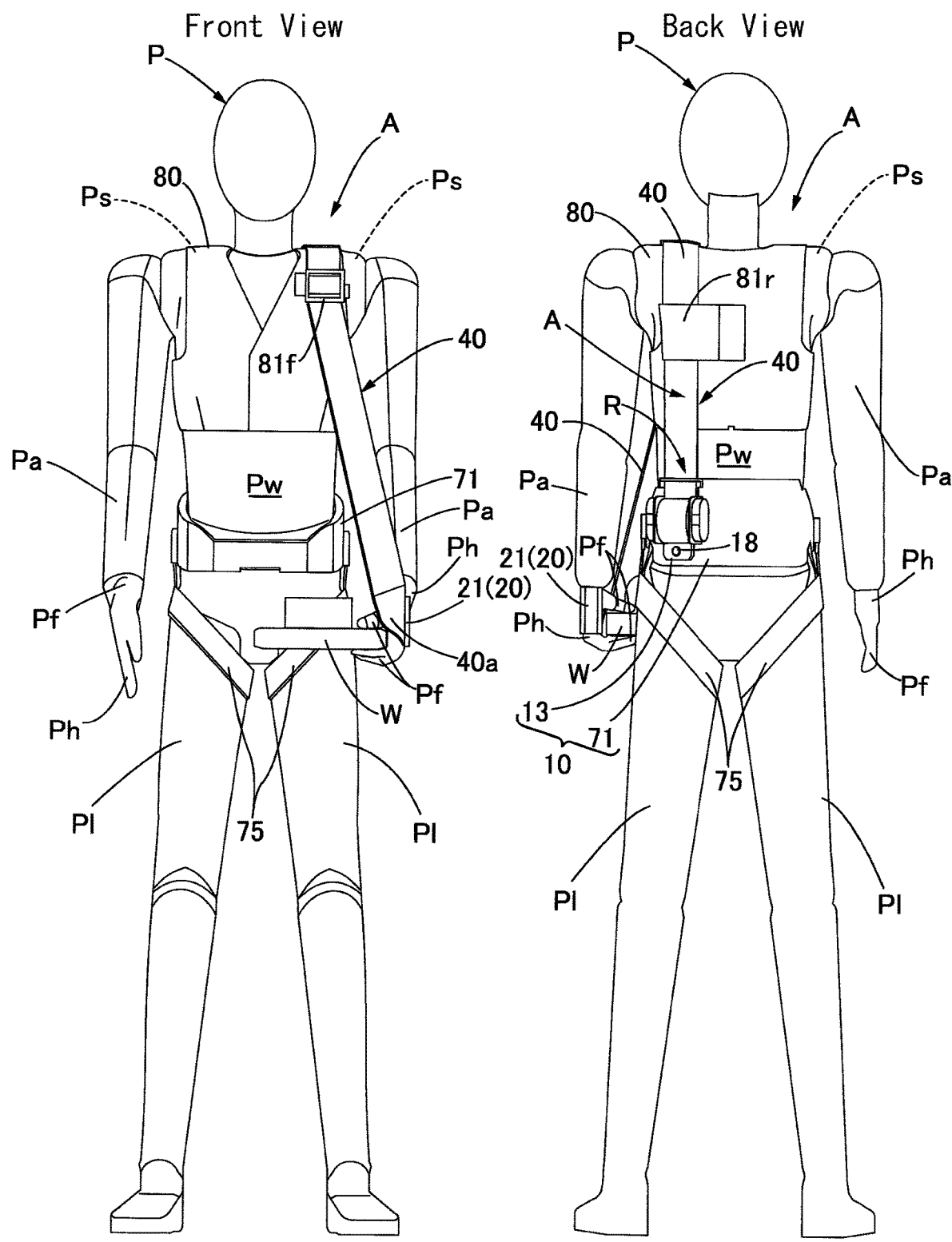
FIG. 14 is a front view corresponding to FIG. 1 and a back view corresponding to FIG. 3 illustrating a state of using a work assisting apparatus according to a third embodiment.

FIG. 14 is a front view and a back view illustrating a state of using a work assisting apparatus A according to a third embodiment. That is, in the first and the second embodiments, the pair of right and left winding devices R, R are disposed to be spaced in parallel on the back side of the worker P, the belts 40 are drawn out from the respective winding devices R, and the wearing portions 20 secured to the respective one end portions 40*a* are worn on the right and left hands Ph. Meanwhile, in the third embodiment, only the winding device R in any one of the right and left sides is disposed, the belt 40 drawn out therefrom is put on the shoulder Ps of the one side of the worker P, and the wearing portion 20 is worn on the hand Ph in the same side.

Since other configurations of the third embodiment are similar to those in the first and the second embodiments, for the components of the third embodiment, the reference numerals the same as those of the corresponding components of the first and the second embodiments are simply attached, and the further descriptions will be omitted.

The third embodiment also achieves the operational advantages basically similar to the operational advantages of the first and the second embodiments. However, especially in the third embodiment, while the cost reduction is intended with the single winding device R, the support force to the worker P provided by the work assisting apparatus A in the heavy object lifting work is reduced to the half. Therefore, the third embodiment is effective in a case where the weight of the heavy object W to be lifted is relatively small (for example, a case where a small luggage is lifted with one hand).

Figure 15:
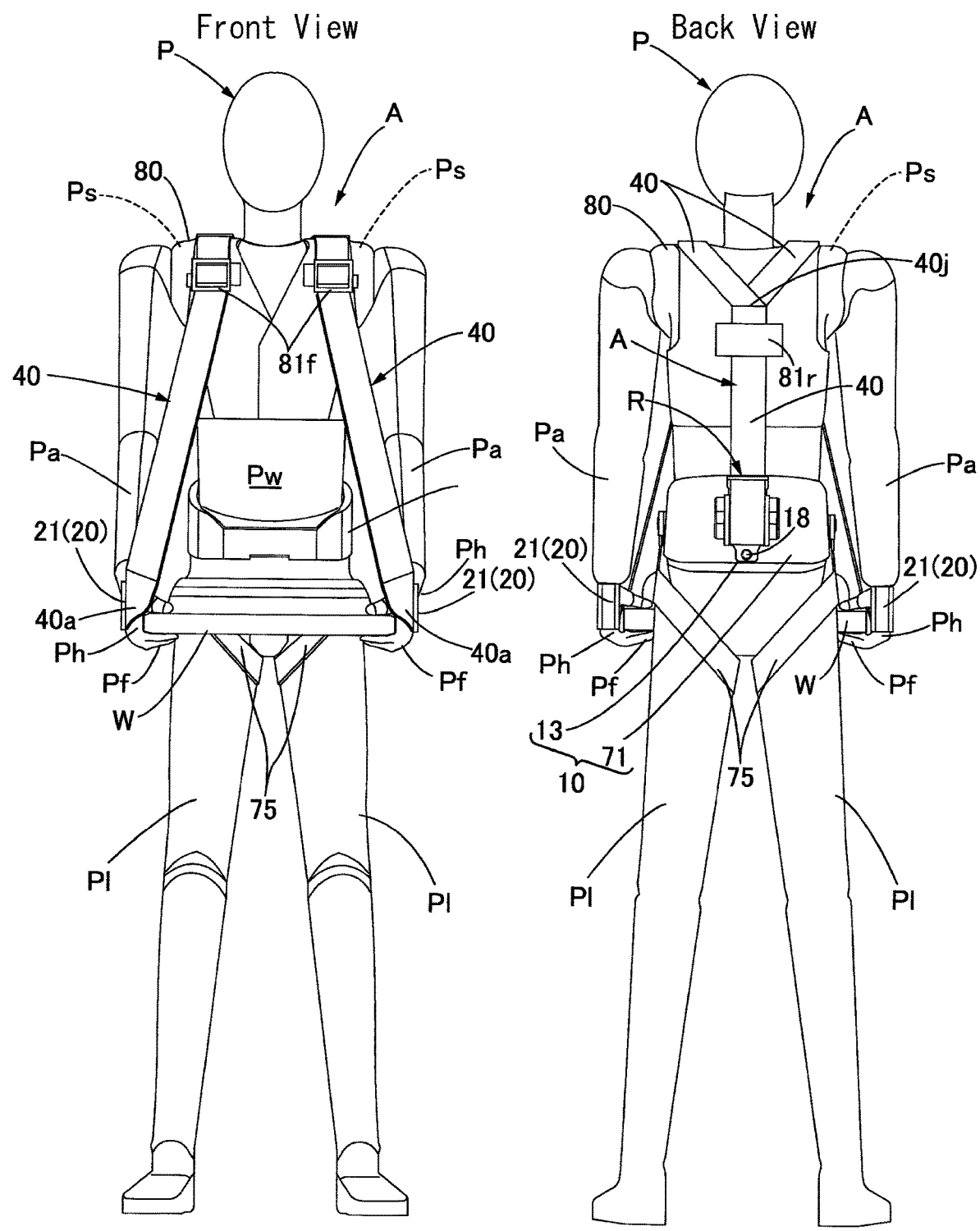
FIG. 15 is a front view corresponding to FIG. 1 and a back view corresponding to FIG. 3 illustrating a state of using a work assisting apparatus according to a fourth embodiment.

FIG. 15 is a front view and a back view illustrating a state of using a work assisting apparatus A according to a fourth embodiment. While a single winding device R is disposed also in the fourth embodiment, the belt 40 drawn out therefrom includes a branching portion 40*j* at which the belt 40 is branched into two on the way (especially, the back side). The pair of right and left belts 40 branched at the branching portion 40*j* are, similarly to the first embodiment, put on the right and left shoulders Ps of the worker P, and further, the wearing portions 20 are worn on the respective right and left hands Ph.

Since other configurations of the fourth embodiment are similar to those in the first and the second embodiments, for the components of the fourth embodiment, the reference numerals the same as those of the corresponding components of the first and the second embodiments are simply attached, and the further descriptions will be omitted.

The fourth embodiment also achieves the operational advantages basically similar to the operational advantages of the first and the second embodiments. However, especially in the fourth embodiment, not only the single winding device R is enough, but also the amount of using the belt 40 from the winding device R to the branching portion 40*j* can be reduced, thus allowing achieving the cost reduction by its amount.

Figure 16:
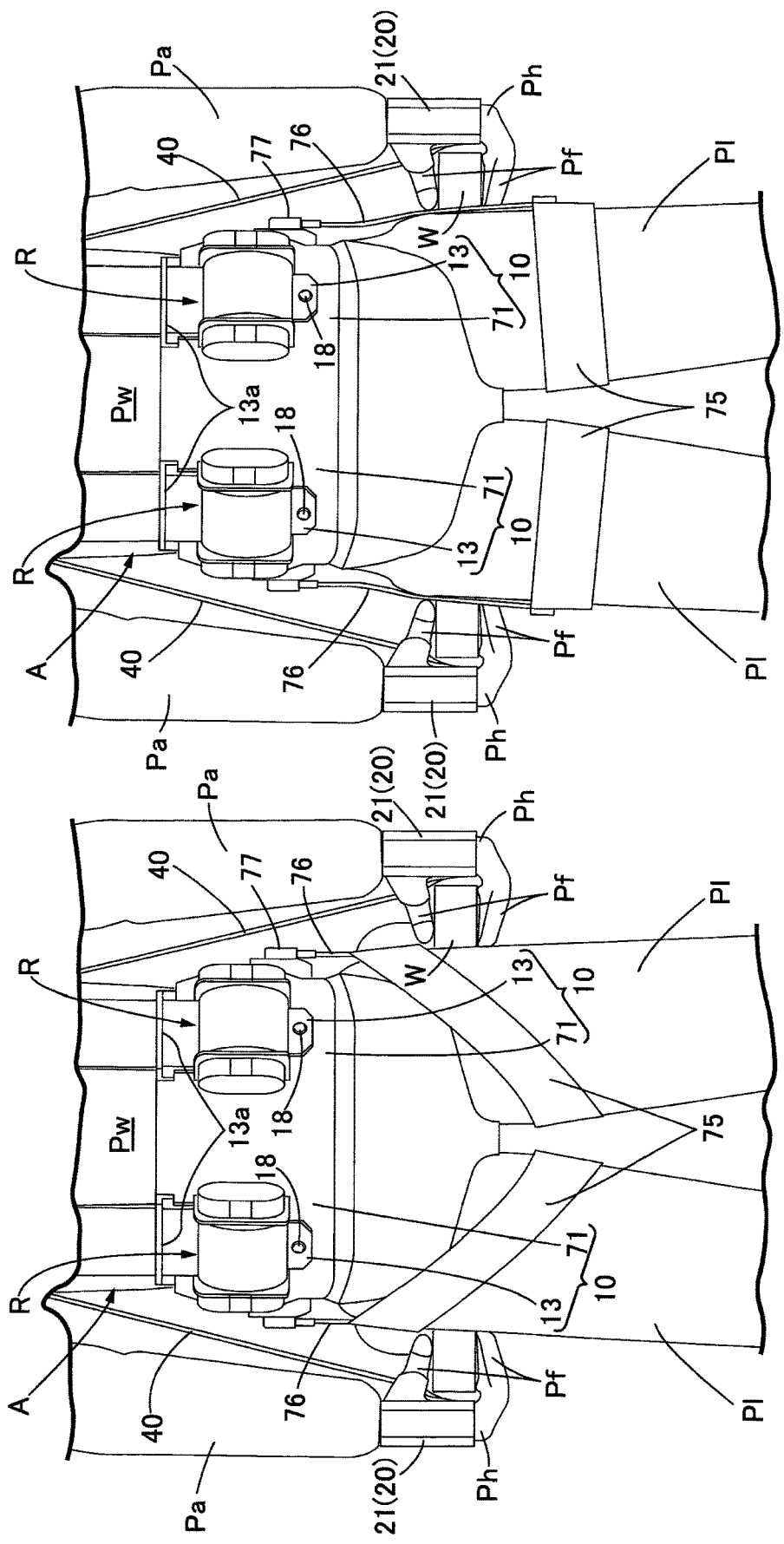
FIGS. 16A and 16B illustrate variations of a leg belt.

FIGS. 16A and 16B illustrate variations of the leg belt 75, especially, FIG. 16A illustrates a leg belt 75 (corresponding to the first and the second embodiments) obliquely wound around the thigh, and FIG. 16B illustrates a leg belt 75 approximately horizontally wound around the thigh. The leg belt 75 of FIG. 16B is different from the leg belt 75 of the first and the second embodiments only in the way of winding around the thigh Pl, and can achieve the operational advantages basically similar to those of the first and the second embodiments.

Figure 17:
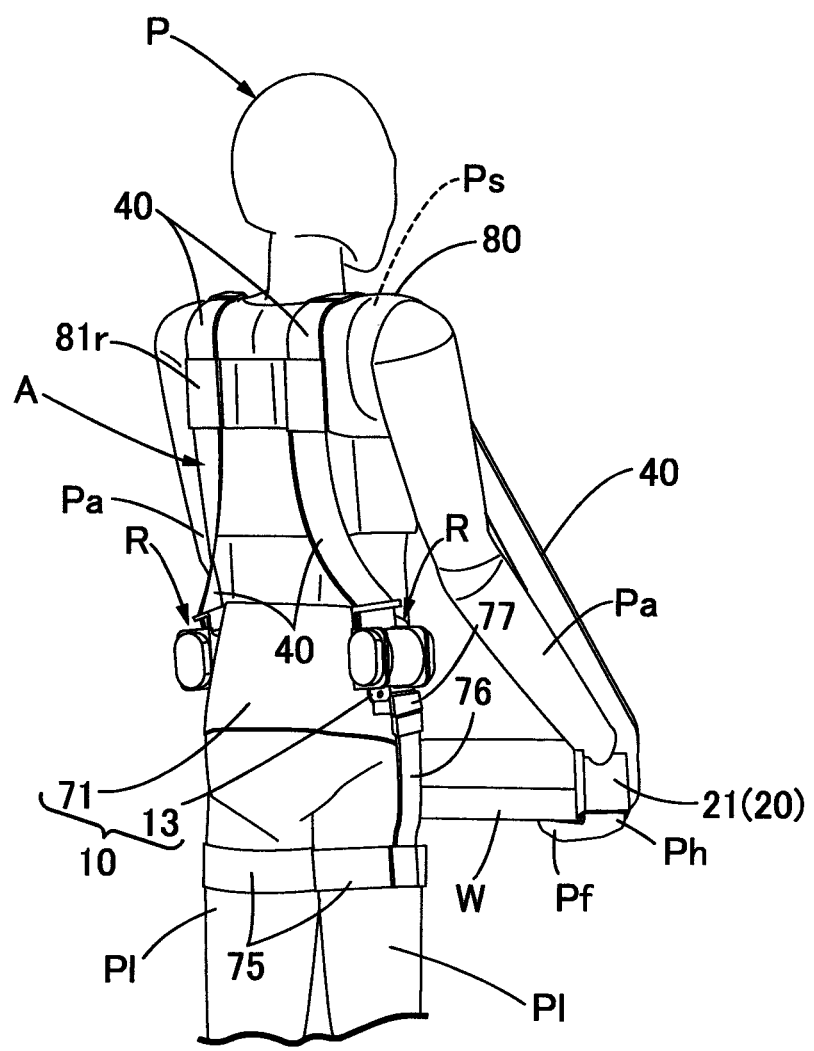
FIG. 17 is a rear perspective view illustrating a first modification of the first and the second embodiments in which the winding devices are fitted on the sides of the waist part of the worker.
Figure 18:
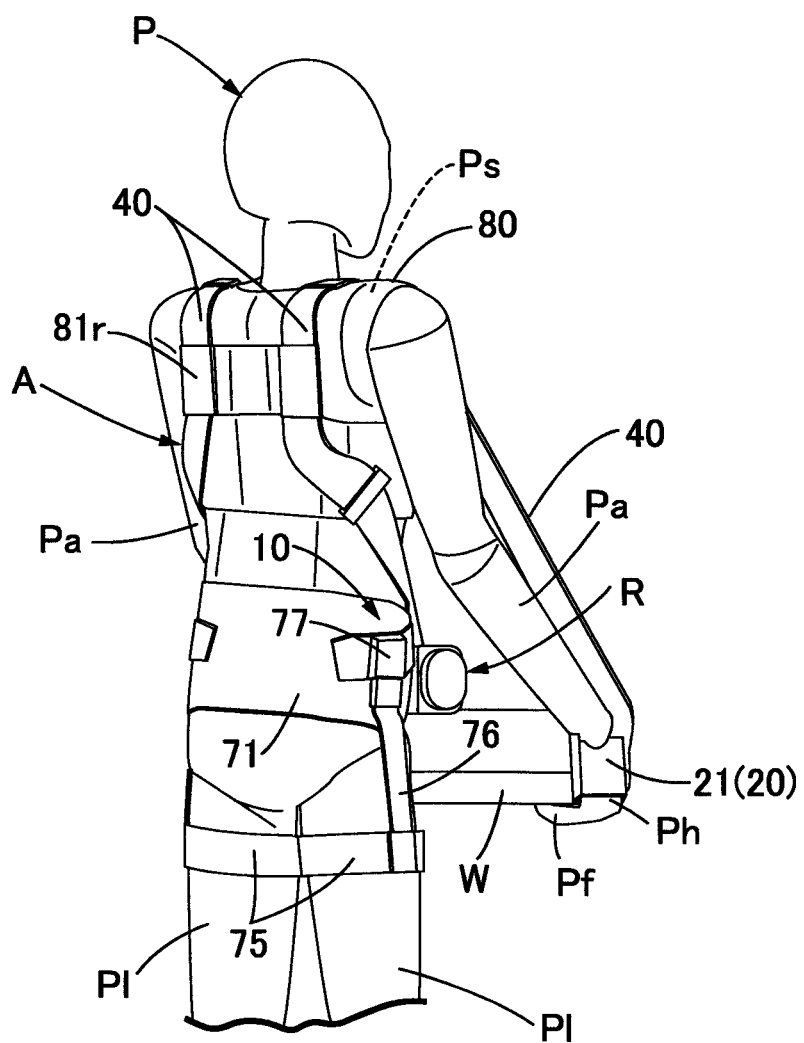
FIG. 18 is a rear perspective view illustrating a second modification of the first and the second embodiments in which the winding devices are fitted on the front of the waist part of the worker.

Further, FIG. 17 illustrates a first modification of the first and the second embodiments in which the winding devices R are fitted on the sides of the waist part Pw. FIG. 18 illustrates a second modification of the first and the second embodiments in which the winding devices R are fitted on the front of the waist part Pw. These modifications also can achieve the operational advantages basically similar to those of the first and the second embodiments.

While the embodiments of the present invention have been described above, the present invention is not limited to the above-described embodiments, and various changes of design can be made without departing from the present invention described in the claims.

For example, while the example in which the wearing portion 20 has the structure wearable on the hand Ph of the worker P is described in the embodiment, in the present invention, the wearing portion 20 configured to be wearable on the arm Pa of the worker P may be used.

While the belt 40 is drawn out from the winding device R by the worker P by oneself in the embodiment, another person different from the worker P may draw out the belt 40 and help the worker P wear the wearing portion 20 on the hand Ph or the arm Pa of the worker P.

Especially, the first embodiment describes the configuration in which the unlocking instruction device C is the automatic unlocking instruction device 50 that automatically releases the lock of the lock mechanism 30 corresponding to the determination of before the start and after the end of the work based on the detection result by the detector 51. The second embodiment describes the configuration in which the unlocking instruction device C is the manual unlocking instruction device 50' that manually releases the lock of the lock mechanism 30 in conjunction with the operation input to the unlock operation device (remote control device 56, switch 54', unlock operation lever, or the like) configured to be manually operated as necessary. However, the present invention may include both of the automatic unlocking instruction device 50 and the manual unlocking instruction device 50' as the unlocking instruction devices C.

The first embodiment describes the configuration in which the detector 51 linked with the automatic unlocking instruction device 50 is configured to detect the change of the contact surface pressure or the relative distance between the wearing portion 20 and the heavy object W before and after the start and before and after the end of the work, and the controller 55 determines it to be before the start or after the end of the work from the detection result and releases the lock of the lock mechanism 30. However, the detector 51 is not limited to the embodiment, and applicable insofar as the detector 51 can detect any change in work state before and after the start and before and after the end of the work.

While the embodiment describes the configuration in which the power source of the biasing mechanism 31 of the winding device R is the spiral spring 32, and its spring force is used for the winding biasing force, an electric motor may be used as the power source of the biasing mechanism 31. However, also in this case, the winding device R is simply used for only winding the belt 40, and does not need to turn or pull up the sturdy and heavy rigid frame as described in the above-described disclosures. Therefore, a motor with a relatively small output can be used, and the cost increase can be suppressed.

The embodiment describes the configuration in which the vest 80 as a work jacket that the worker P can wear such that the vest 80 covers at least upper portions of the shoulders Ps of the worker P is used, and the vest 80 includes the belt guides 81f, 81r through which the belt 40 slidably passes so as to keep the state where the intermediate portion of the belt 40 is put on the shoulder Ps of the worker P. However, the vest 80 as a work jacket is not necessarily included in the work assisting apparatus A of the present invention, and for example, the worker P in normal clothes without wearing the vest 80 may slidably put the intermediate portion of the belt 40 directly on the shoulder Ps. Alternatively, a jacket in a style other than the vest 80 (for example, a blazer, a shirt) may be used as a work jacket of the present invention, and the belt guides 81f, 81r may be disposed on the front surface and the rear surface thereof.

The embodiment describes the configuration in which the winding device R is fitted on the waist part Pw of the worker P via the fitting portion 10 including the waist belt 71. However, the wearing portion of the winding device R is not limited to the embodiment, and the winding device R may be fitted on the portion of the torso Pm other than the waist part Pw (for example, shoulder Ps, back, or the like). Especially, when the winding device R is fitted on the shoulder Ps, it is not necessary to put the intermediate portion of the belt 40 drawn out from the winding device R on the shoulder Ps of the worker P.

REFERENCE SIGNS LIST

A . . . work assisting apparatus
C . . . unlocking instruction device
P . . . worker
Pa, Pf, Ph, Pl . . . arm, finger, hand, and thigh of worker
Pm, Ps, Pw . . . torso, shoulder, and waist part of worker
R . . . winding device
W . . . heavy object
10 . . . fitting portion
20 . . . wearing portion
30 . . . lock mechanism
31 . . . biasing mechanism
40a . . . one end portion
40j . . . branching portion
50 . . . unlocking instruction device
50' . . . unlocking instruction device
51 . . . detector
54' . . . switch as unlock operation device
56 . . . remote control device as unlock operation device
71 . . . waist belt
75 . . . waist belt
80 . . . vest as work jacket
81f, 81r . . . front and rear belt guides as belt guides

What is claimed is:

1. A work assisting apparatus for assisting work in which a worker grasps a heavy object with a hand and lifts and holds the heavy object, the work assisting apparatus comprising:
    a fitting portion configured to be fitted on a torso of the worker;
    a wearing portion configured to be worn on an arm or the hand of the worker;
    a belt having one end portion combined to the wearing portion; and
    a winding device coupled to the fitting portion and configured to wind another end side of the belt, wherein the winding device includes:
        a biasing mechanism that provides a biasing force in a winding direction to the belt; and
        a lock mechanism configured to lock a draw-out position of the belt so as to restrict further drawing out when the one end portion of the belt is drawn out by any draw-out length, and
    wherein the lock mechanism allows shifting of the belt in the winding direction with the biasing force of the biasing mechanism even in a condition that the draw-out position of the belt is locked so as to restrict shifting of the belt in a draw-out direction.

2. The work assisting apparatus according to claim 1, wherein
    the winding device is fitted to a waist part of the worker via the fitting portion such that an intermediate portion of the belt drawn out from the winding device is slidably put on a shoulder of the worker.

3. The work assisting apparatus according to claim 1, wherein
    the lock mechanism is connected to an unlocking instruction device for releasing the lock of the lock mechanism before a start and after an end of the work.

4. The work assisting apparatus according to claim 3, wherein
    the unlocking instruction device includes at least one of an automatic unlocking instruction device or a manual unlocking instruction device, the automatic unlocking instruction device is configured to automatically release the lock of the lock mechanism before the start and after the end of the work based on a detection result by a detector configured to detect a change of a contact surface pressure or a relative distance between the wearing portion and the heavy object before and after the start and before and after the end of the work, and the manual unlocking instruction device is configured to release the lock of the lock mechanism as needed based on an operation input to an unlock operation device configured to be manually operated as necessary.

5. The work assisting apparatus according to claim 1, wherein
    the wearing portion has a shape in which the wearing portion is wearable by inserting the hand through the wearing portion in a state where the wearing portion is caught on at least one finger of the worker.

6. The work assisting apparatus according to claim 1, wherein
    the fitting portion includes a waist belt wound around the waist part of the worker and held on the waist part, and the winding device is coupled to the waist belt.

7. The work assisting apparatus according to claim 6, wherein
    the waist belt is connected to a leg belt configured to be worn on a thigh by inserting at least one of the thighs of the worker through the leg belt.

8. The work assisting apparatus according to claim 1, wherein
    the belt includes a branching portion at which the belt is branched into two on a way from the other end side toward the one end portion of the belt.

9. The work assisting apparatus according to claim 1, further comprising a work jacket wearable by the worker such that the work jacket covers at least upper portions of the shoulders of the worker, wherein
the work jacket includes a belt guide through which the belt slidably passes so as to keep the state where the intermediate portion of the belt is put on the shoulder of the worker.

\* \* \* \* \*